(12) United States Patent
Jain et al.

(10) Patent No.: US 8,681,813 B2
(45) Date of Patent: Mar. 25, 2014

(54) BANDWIDTH OPTIMIZATION FOR REMOTE DESKTOP PROTOCOL

(75) Inventors: Goutham Vastimal Jain, Bangalore (IN); Khader Basha P R, Bangalore (IN); Paramtap Desai, Santa Clara, CA (US)

(73) Assignee: Wyse Technology L.L.C., San Jose, CA (US)

( * ) Notice: Subject to any disclaimer, the term of this patent is extended or adjusted under 35 U.S.C. 154(b) by 96 days.

(21) Appl. No.: 13/306,804

(22) Filed: Nov. 29, 2011

(65) Prior Publication Data
US 2013/0136125 A1      May 30, 2013

(51) Int. Cl.
*H04J 3/16*      (2006.01)
*H04L 29/06*      (2006.01)

(52) U.S. Cl.
CPC .................................. *H04L 29/06068* (2013.01)
USPC ............................................ 370/466; 709/230

(58) Field of Classification Search
USPC ........... 370/252, 392, 466, 467; 709/230–236
See application file for complete search history.

(56) References Cited

U.S. PATENT DOCUMENTS

| 7,028,025 | B2 | 4/2006 | Collins |
| 7,966,424 | B2 | 6/2011 | Abdo et al. |
| 2010/0246602 | A1* | 9/2010 | Barreto et al. ................. 370/466 |
| 2011/0185071 | A1* | 7/2011 | Schmieder et al. ........... 709/228 |

OTHER PUBLICATIONS

International Search Report and Written Opinion; PCT/US2012/050808; pp. 8, Oct. 23, 2012.

* cited by examiner

*Primary Examiner* — Kan Yuen
(74) *Attorney, Agent, or Firm* — Baker Botts L.L.P.

(57) ABSTRACT

The processing of a first data stream to generate a second stream conforming to a remote desktop protocol (RDP) is described. Operations may include facilitating storage of first data from the first stream at a first index indicated in the first stream, facilitating retrieval of second data from a second index included in the first stream, and facilitating generation of the second stream conforming to the RDP and including the first and second data. Additionally, the processing of a third data stream conforming to the RDP to stream a fourth stream is described. Operations include facilitating processing of the third stream to identify a package data unit (PDU), facilitating storing of a hash value corresponding to the PDU, and facilitating generating an altered PDU for inclusion in the fourth stream and including an index identifying a location in memory storing the hash value.

16 Claims, 15 Drawing Sheets

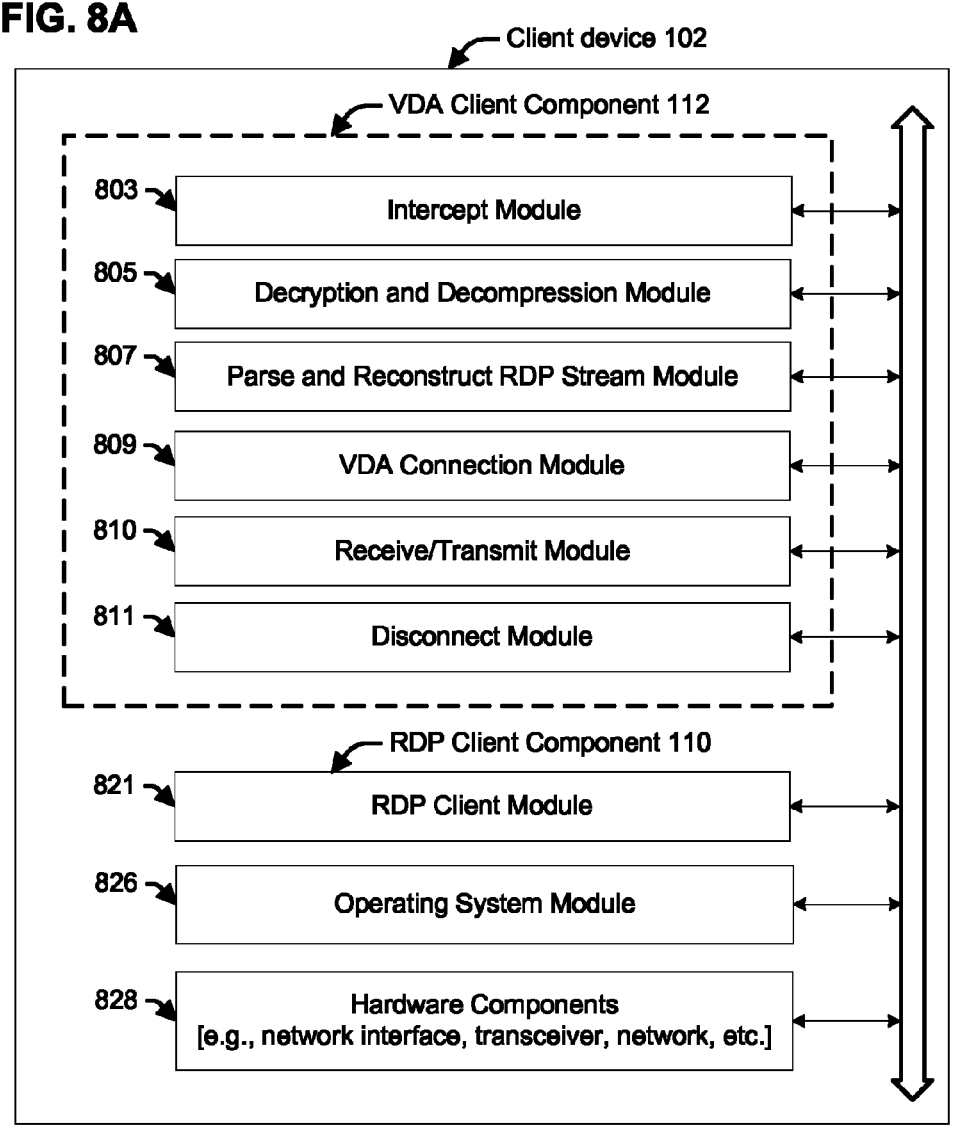

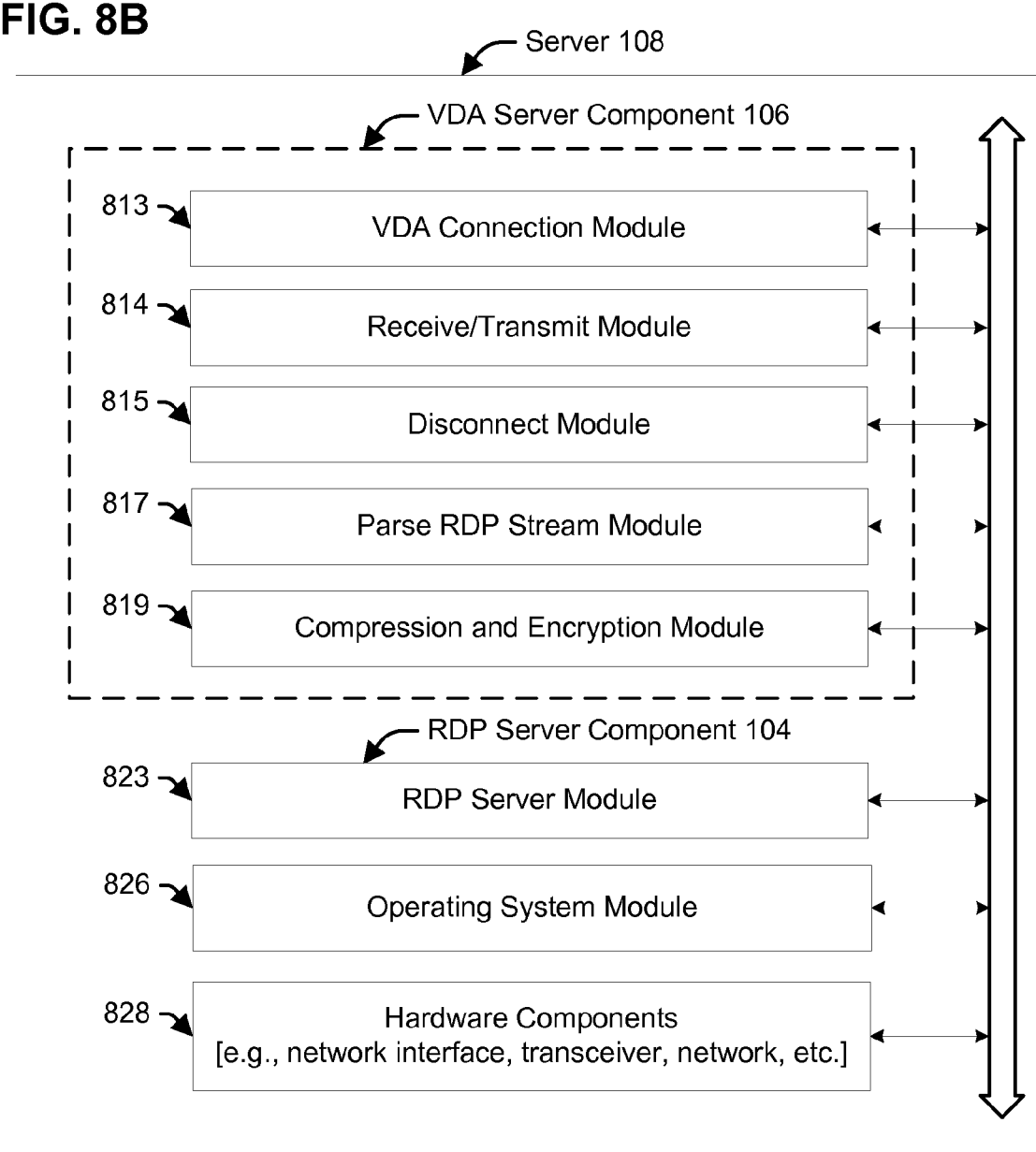

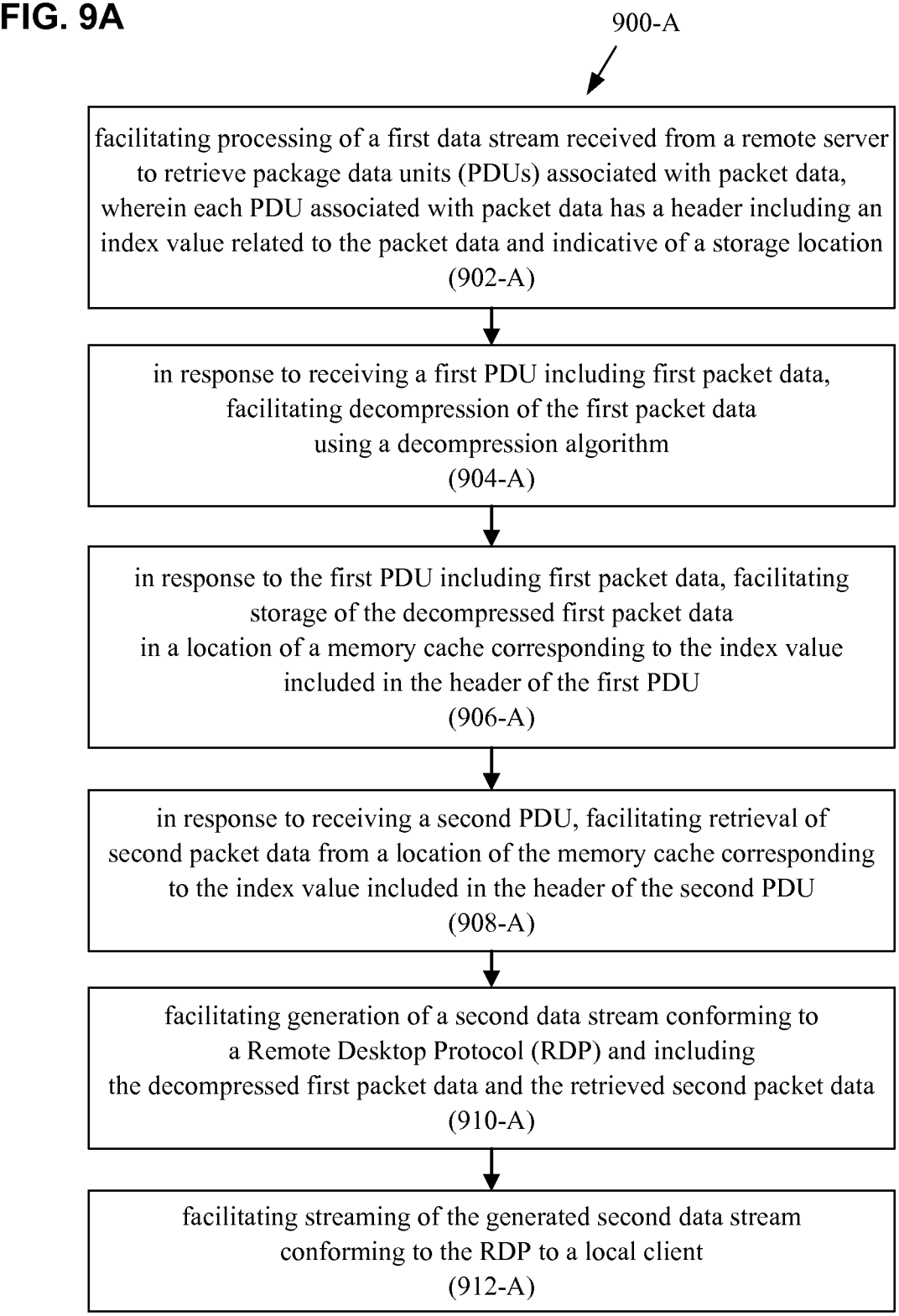

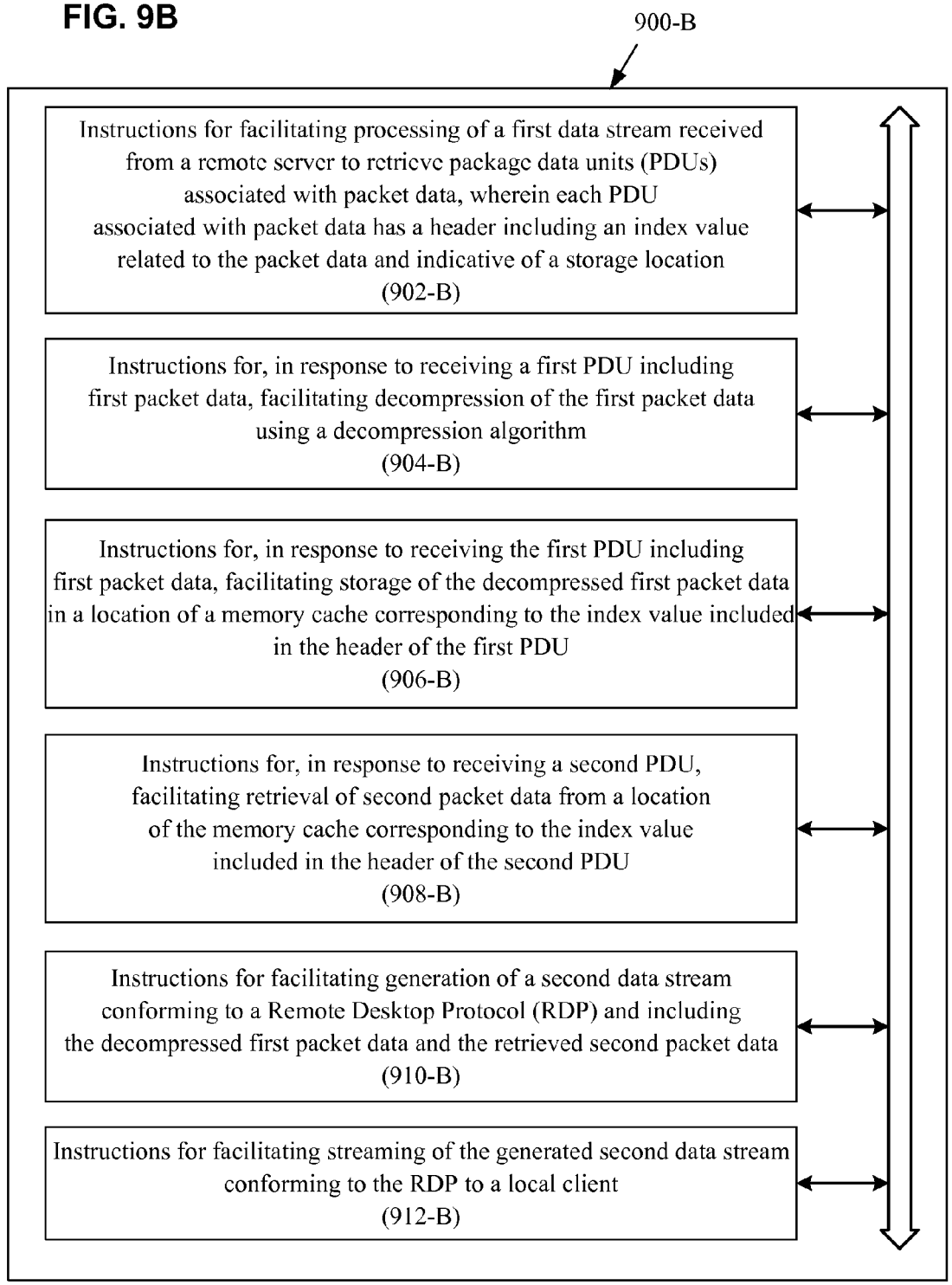

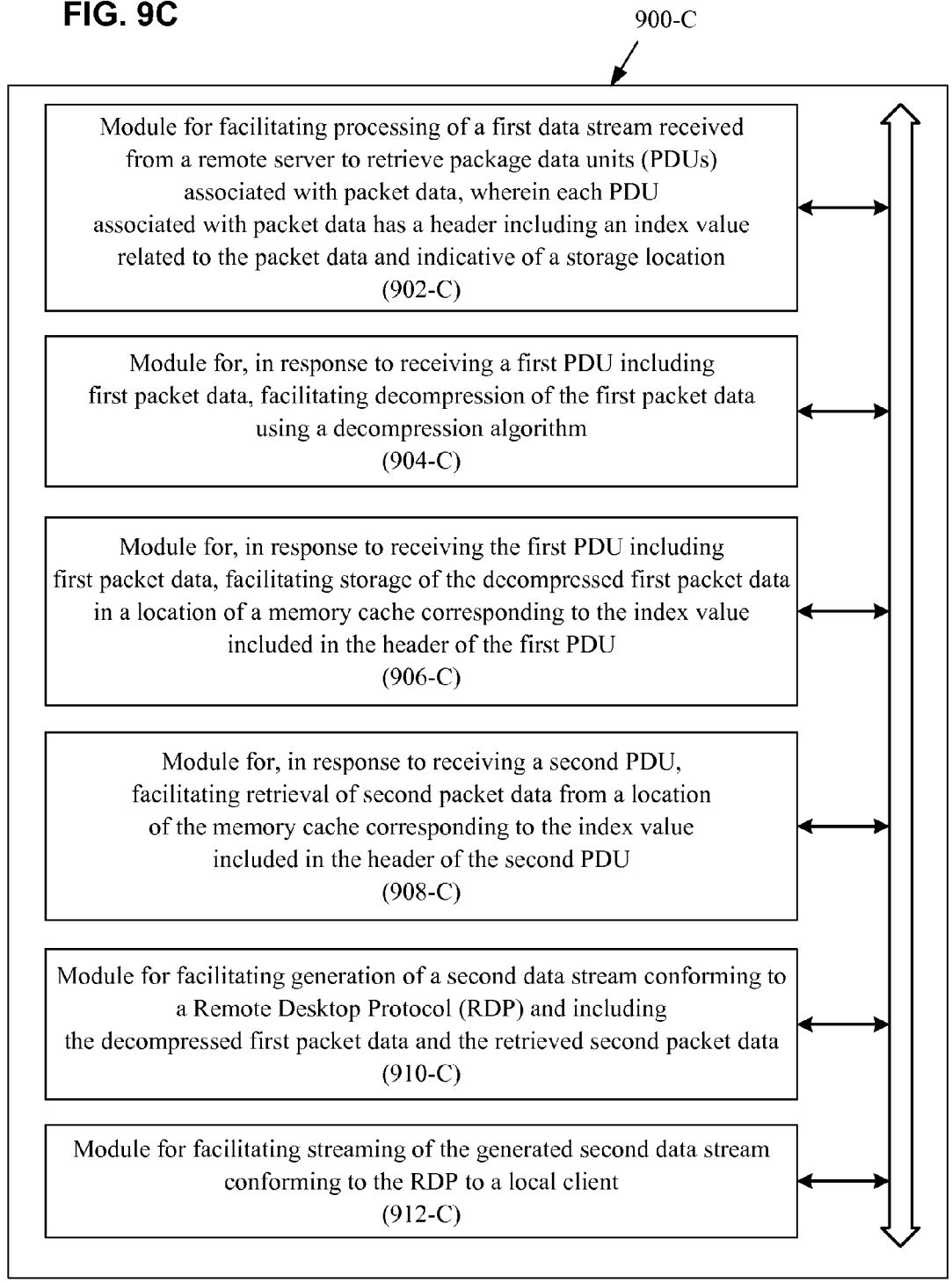

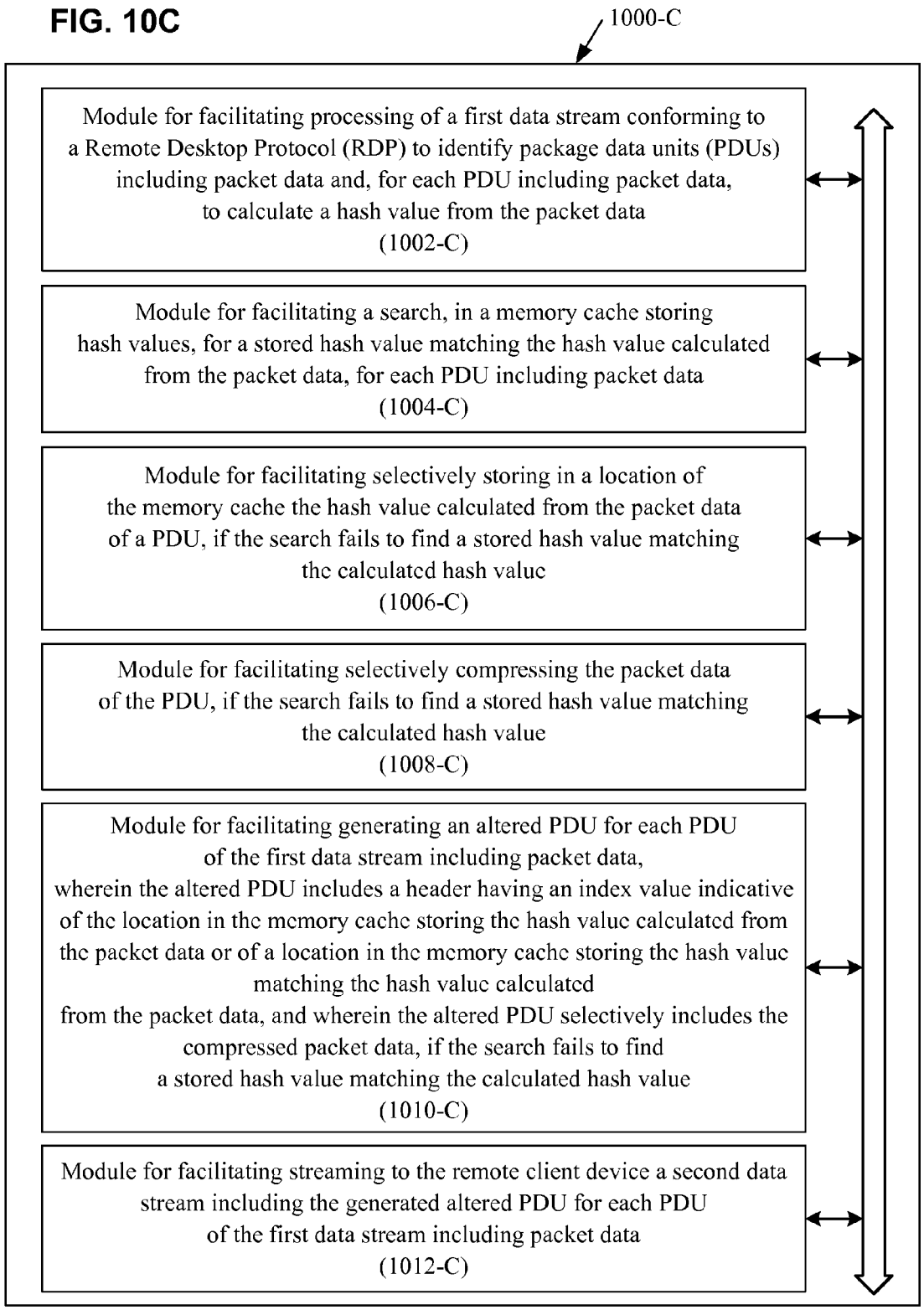

BANDWIDTH OPTIMIZATION FOR REMOTE DESKTOP PROTOCOL

FIELD

The disclosure relates in general to remote desktop protocols, and more particularly to providing improved bandwidth optimization for remote desktop protocol.

BACKGROUND

The remote desktop protocol (RDP) is a communication protocol used for providing access to a remote device using a graphical interface. RDP can be used, for example, in a client/server application to provide a user of a first computing device a graphical interface showing a desktop environment of a user session running on a remote server device. The RDP is generally used to transport large quantities of image data (as well as other types of data) over a communication network in order to provide the graphical interface from the remote device to the user's device with minimal delay, so to enable the user to interact with the remote device in real-time. In environments in which the communication network has limited bandwidth, and/or in environment in which communication between the user's and the remote devices is subject to packet loss and/or communication delays, the performance of the RDP may suffer. For instance, the user may experience a choppy and/or incomplete version of the graphical user interface running on the remote device. In order to improve the user's experience, methods and systems are needed to reduce the bandwidth utilization of the RDP, and to minimize performance degradation of the RDP across lossy and/or delayed communication links.

SUMMARY

In one aspect of the disclosure, a method for processing a first data stream received from a remote server to generate a second data stream conforming to a remote desktop protocol (RDP) may comprise: facilitating processing of the first data stream received from the remote server to retrieve package data units (PDUs) associated with packet data, wherein each PDU associated with packet data has a header including an index value related to the packet data and indicative of a storage location; in response to receiving a first PDU including first packet data, facilitating decompression of the first packet data using a decompression algorithm and facilitating storage of the decompressed first packet data in a location of a memory cache corresponding to the index value included in the header of the first PDU; in response to receiving a second PDU, facilitating retrieval of second packet data from a location of the memory cache corresponding to the index value included in the header of the second PDU; facilitating generation of the second data stream conforming to the RDP and including the decompressed first packet data and the retrieved second packet data; and facilitating streaming of the generated second data stream conforming to the RDP to a local client.

In one aspect of the disclosure, a method for processing a first data stream conforming to a remote desktop protocol (RDP) to stream a second data stream to a remote client device comprises: facilitating processing of the first data stream conforming to the RDP to identify package data units (PDUs) including packet data and, for each PDU including packet data, to calculate a hash value from the packet data; facilitating a search, in a memory cache storing hash values, for a stored hash value matching the hash value calculated from the packet data, for each PDU including packet data; facilitating selectively storing in a location of the memory cache the hash value calculated from the packet data of a PDU, if the search fails to find a stored hash value matching the calculated hash value; facilitating selectively compressing the packet data of the PDU, if the search fails to find a stored hash value matching the calculated hash value; facilitating generating an altered PDU for each PDU of the first data stream including packet data, wherein the altered PDU includes a header having an index value indicative of the location in the memory cache storing the hash value calculated from the packet data or of a location in the memory cache storing the hash value matching the hash value calculated from the packet data, and wherein the altered PDU selectively includes the compressed packet data, if the search fails to find a stored hash value matching the calculated hash value; and facilitating streaming to the remote client device the second data stream including the generated altered PDU for each PDU of the first data stream including packet data.

In one aspect of the disclosure, a machine-readable storage medium encoded with instructions executable by one or more processors to perform one or more operations for processing a first data stream received from a remote server to generate a second data stream conforming to a remote desktop protocol (RDP). The one or more operations may comprise: facilitating processing of the first data stream received from the remote server to retrieve package data units (PDUs) associated with packet data, wherein each PDU associated with packet data has a header including an index value related to the packet data and indicative of a storage location; in response to receiving a first PDU including first packet data, facilitating decompression of the first packet data using a decompression algorithm and facilitating storage of the decompressed first packet data in a location of a memory cache corresponding to the index value included in the header of the first PDU; in response to receiving a second PDU, facilitating retrieval of second packet data from a location of the memory cache corresponding to the index value included in the header of the second PDU; facilitating generation of the second data stream conforming to the RDP and including the decompressed first packet data and the retrieved second packet data; and facilitating streaming of the generated second data stream conforming to the RDP to a local client.

In one aspect of the disclosure, a machine-readable storage medium encoded with instructions executable by one or more processors to perform one or more operations for processing a first data stream conforming to a remote desktop protocol (RDP) to stream a second data stream to a remote client device. The one or more operations may comprise: facilitating processing of the first data stream conforming to the RDP to identify package data units (PDUs) including packet data and, for each PDU including packet data, to calculate a hash value from the packet data; facilitating a search, in a memory cache storing hash values, for a stored hash value matching the hash value calculated from the packet data, for each PDU including packet data; facilitating selectively storing in a location of the memory cache the hash value calculated from the packet data of a PDU, if the search fails to find a stored hash value matching the calculated hash value; facilitating selectively compressing the packet data of the PDU, if the search fails to find a stored hash value matching the calculated hash value; facilitating generating an altered PDU for each PDU of the first data stream including packet data, wherein the altered PDU includes a header having an index value indicative of the location in the memory cache storing the hash value calculated from the packet data or of a location in the memory cache storing the hash value matching the hash value calculated from the packet data, and wherein the altered PDU selectively includes the compressed packet data, if the search fails to find a stored hash value matching the calculated hash value; and facilitating streaming to the remote client device the second data stream including the generated altered PDU for each PDU of the first data stream including packet data.

In one aspect of the disclosure, a hardware apparatus for processing a first data stream received from a remote server to generate a second data stream conforming to a remote desktop protocol (RDP) comprises one or more modules configured to perform one or more operations. The one or more operations may comprise: facilitating processing of the first data stream received from the remote server to retrieve package data units (PDUs) associated with packet data, wherein each PDU associated with packet data has a header including an index value related to the packet data and indicative of a storage location; in response to receiving a first PDU including first packet data, facilitating decompression of the first packet data using a decompression algorithm and facilitating storage of the decompressed first packet data in a location of a memory cache corresponding to the index value included in the header of the first PDU; in response to receiving a second PDU, facilitating retrieval of second packet data from a location of the memory cache corresponding to the index value included in the header of the second PDU; facilitating generation of the second data stream conforming to the RDP and including the decompressed first packet data and the retrieved second packet data; and facilitating streaming of the generated second data stream conforming to the RDP to a local client.

In one aspect of the disclosure, a hardware apparatus for processing a first data stream conforming to a remote desktop protocol (RDP) to stream a second data stream to a remote client device comprises one or more modules configured to perform one or more operations. The one or more operations may comprise: facilitating processing of the first data stream conforming to the RDP to identify package data units (PDUs) including packet data and, for each PDU including packet data, to calculate a hash value from the packet data; facilitating a search, in a memory cache storing hash values, for a stored hash value matching the hash value calculated from the packet data, for each PDU including packet data; facilitating selectively storing in a location of the memory cache the hash value calculated from the packet data of a PDU, if the search fails to find a stored hash value matching the calculated hash value; facilitating selectively compressing the packet data of the PDU, if the search fails to find a stored hash value matching the calculated hash value; facilitating generating an altered PDU for each PDU of the first data stream including packet data, wherein the altered PDU includes a header having an index value indicative of the location in the memory cache storing the hash value calculated from the packet data or of a location in the memory cache storing the hash value matching the hash value calculated from the packet data, and wherein the altered PDU selectively includes the compressed packet data, if the search fails to find a stored hash value matching the calculated hash value; and facilitating streaming to the remote client device the second data stream including the generated altered PDU for each PDU of the first data stream including packet data.

In one aspect of the disclosure, an apparatus for processing a first data stream received from a remote server to generate a second data stream conforming to a remote desktop protocol (RDP) may comprise: means for facilitating processing of the first data stream received from the remote server to retrieve package data units (PDUs) associated with packet data, wherein each PDU associated with packet data has a header including an index value related to the packet data and indicative of a storage location; means for, in response to receiving a first PDU including first packet data, facilitating decompression of the first packet data using a decompression algorithm and facilitating storage of the decompressed first packet data in a location of a memory cache corresponding to the index value included in the header of the first PDU; means for, in response to receiving a second PDU, facilitating retrieval of second packet data from a location of the memory cache corresponding to the index value included in the header of the second PDU; means for facilitating generation of the second data stream conforming to the RDP and including the decompressed first packet data and the retrieved second packet data; and means for facilitating streaming of the generated second data stream conforming to the RDP to a local client.

In one aspect of the disclosure, an apparatus for processing a first data stream conforming to a remote desktop protocol (RDP) to stream a second data stream to a remote client device may comprise: means for facilitating processing of the first data stream conforming to the RDP to identify package data units (PDUs) including packet data and, for each PDU including packet data, to calculate a hash value from the packet data; means for facilitating a search, in a memory cache storing hash values, for a stored hash value matching the hash value calculated from the packet data, for each PDU including packet data; means for facilitating selectively storing in a location of the memory cache the hash value calculated from the packet data of a PDU, if the search fails to find a stored hash value matching the calculated hash value; means for facilitating selectively compressing the packet data of the PDU, if the search fails to find a stored hash value matching the calculated hash value; means for facilitating generating an altered PDU for each PDU of the first data stream including packet data, wherein the altered PDU includes a header having an index value indicative of the location in the memory cache storing the hash value calculated from the packet data or of a location in the memory cache storing the hash value matching the hash value calculated from the packet data, and wherein the altered PDU selectively includes the compressed packet data, if the search fails to find a stored hash value matching the calculated hash value; and means for facilitating streaming to the remote client device the second data stream including the generated altered PDU for each PDU of the first data stream including packet data.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

FIGS. 8A and 8B each respectively illustrate a simplified block diagram of a client device and a server, in accordance with various aspects of the subject technology.

FIGS. 9A, 9B, and 9C are block diagrams representing examples of a method, a machine-readable storage medium encoded with instructions, and an apparatus for processing a first data stream received from a remote server to generate a second data stream conforming to a remote desktop protocol (RDP), in accordance with one aspect of the disclosure.

FIGS. 10A, 10B, and 10C are block diagrams representing examples of a method, a machine-readable storage medium encoded with instructions, and an apparatus for processing a first data stream conforming to a remote desktop protocol (RDP) to stream a second data stream to a remote client device, in accordance with one aspect of the disclosure.

DETAILED DESCRIPTION

Figure 1:
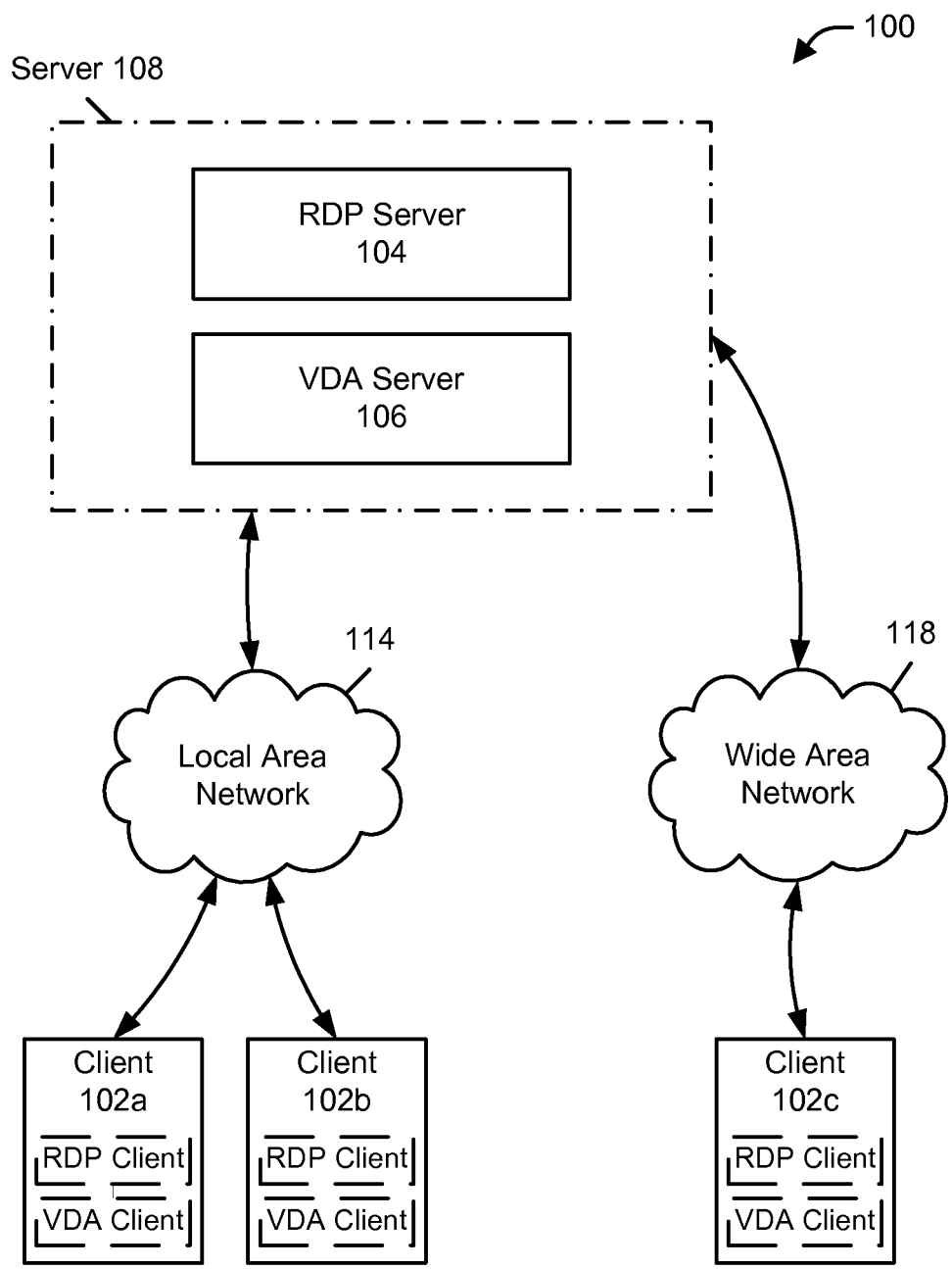
FIG. 1 illustrates a simplified diagram of a system, in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

The remote desktop protocol (RDP) is a communication protocol used to provide access to a remote device using a graphical interface. The RDP can be used, for example, in a client/server application to provide a user of a first computing device a graphical interface showing a desktop environment of a user session running on a remote server device. The RDP can also be used to provide the user of the first computing device with a graphical interface showing a desktop environment of another local or remote computing device. The RDP can be especially useful in client/server implementations in which client applications and client terminals are designed so that the majority of the heavily used resources are at a remote computing machine, such as a centralized server, connected to the client terminal via a network. The client terminal may have minimal memory, disk storage, and processor power, but may be designed under the premise that most users connected to a powerful server do not need the additional processing power. Indeed, the client terminal may only require sufficient processing power and memory storage to receive a stream of RDP data, to process and display the RDP data on the client terminal, to receive user input data, and to transmit the user input data to the server. With these client terminals, the total cost of ownership is minimized, because of the reduced resources and because the clients can be centrally administered from the server.

More particularly, the RDP can be used for a remote connection from a RDP client device running a Windows operating system (OS) based device to a RDP server. The RDP can also be used for a remote connection from a RDP client device running other types of operating systems, such as Linux, UNIX, Android, iOS, or any other appropriate OS platform. The RDP server can send screen image data, such as by sending multiple screen images forming a grid of 16×16 bitmap images per screen frame. In general, the screen images may form a major portion of the data being transmitted using the RDP protocol, and may be transmitted in a bitmap format. The RDP server can alternatively or additionally send other types of data, including text data, RDP header data, RDP control data, binary data blocks, and/or the like. In general, the data transported by the RDP protocol (including image, text, RDP header, RDP control, and binary data block data, or the like) can be referred to as packet data herein. In some instances, one or more of the screen images may be repeated in different screen frames, or one or more of the other types of data may be repeated in different packets. However, even in situations in which one or more of the screen images (or other types of data) are repeated, the RDP protocol retransmits all of the screen images in each frame (or other types of data in each packet), every time, without any optimization. In order to improve the efficiency of the RDP protocol, methods and systems that provide RDP data caching may obviate the need to retransmit all screen images in each frame (and/or retransmit all repeated packet data). For example, a memory cache may store the images sent by the RDP server at the client, the RDP server may be configured to later send only the image index of a stored image if the image is repeated, and the RDP client may be configured to load the stored/repeated image from the memory cache on the RDP client when an image index is received. Similarly, the memory cache may store data received from the RDP server at the client, the RDP server may be configured to send only the data index of stored data if the data is repeated, and the RDP client may be configured to load the stored/repeated data from the memory cache. The use of a memory cache may thus help in increasing the efficiency and lowering the bandwidth usage of the RDP protocol.

Additionally, the images sent in the RDP protocol from the RDP server can be compressed to further increase the efficiency and reduce the bandwidth usage of the RDP. For example, the screen images may be compressed by different image compression algorithms, such as image compression conforming to the JPEG, TIFF, or RLE standards. The memory cache storing the images on the RDP client may store the images as de-compressed images, such that the terminal server need not compress the repeated images and the terminal client device (i.e., the device running the RDP client) need not require decompression logic to repeatedly decompress images loaded from the memory cache. As such, the RDP data caching may further reduce the processing load on the RDP server and client by requiring fewer screen images to be compressed and decompressed, thereby further improving the performance of the protocol as the number of repeated images increases.

Furthermore, the RDP protocol commonly uses a run-length encoding (RLE) image compression algorithm which may not be an optimal image compression algorithm. Hence, the efficiency of the RDP protocol can further be improved by compressing each screen image using a compression algorithm having a higher compression ratio, such as JPEG, TIFF, or other similar high-compression-ratio image compression algorithms. By using a compression algorithm having a higher compression ratio, the quantity of image data that needs to be transferred over the network can be minimized.

Finally, the RDP uses packets conforming to the transport control protocol/internet protocol (TCP/IP) standard to communicate between the client device and the remote server device. While the use of the TCP/IP transport protocol may provide suitable performance in a network environment having a short latency (e.g., a network latency of less than 90 ms), an RDP session running over a TCP/IP link may experience severely degraded performance when the network latency increases (e.g., for network latencies of more than 90-100 ms). In network environments having higher network latencies (e.g., latencies of 90-100 ms or more), the performance of the RDP may be improved by using a user datagram protocol (UDP) or improved UDP (e.g., UDP Plus) transport protocol for communicating RDP packet data between the client device and the remote server.

Overall System

FIG. 1 illustrates a simplified diagram of a system 100, in accordance with various aspects of the subject technology. The system 100 may include one or more client computing devices 102 (e.g., client devices 102a, 102b, and 102c, referenced generally as client device 102) in communication with a server computing device 108 (server) via either a public network 118 or a corporate network 114. In some aspects, the server 108 is configured to allow remote sessions (e.g., remote desktop sessions) wherein users can access applications and files on the server 108 by logging onto the server 108 from a client device 102. Such a connection may be established using any of several well-known techniques such as the Remote Desktop Protocol (RDP) on a server running an operating system that is based on or compatible with operating systems including Windows, Linux, UNIX, Android, iOS, or other operating system platforms. In some aspects, the client devices 102 may communicate with the server 108 using file transfer protocol (FTP), hypertext transfer protocol (HTTP), hypertext transfer protocol secure (HTTPS), or other suitable protocols.

By way of illustration and not limitation, a client device 102 can represent a computer, a mobile phone, a laptop computer, a thin client device, a personal digital assistant (PDA), a portable computing device, or a suitable device with a processor. In one example, a client device 102 is a smartphone (e.g., iPhone, Android phone, Blackberry, etc.). In certain configurations, a client device 102 can represent a cashier device, an audio player, a game console, a camera, a camcorder, an audio device, a video device, a multimedia device, or a device capable of supporting a connection to a remote server. In one example, a client device 102 can be mobile. In another example, a client device 102 can be stationary. According to one aspect of the disclosure, a client device 102 may be a device having at least a processor and memory, where the total amount of memory of the client device 102 could be less than the total amount of memory in a server 108. In one example, a client device 102 does not have a hard disk. In one aspect, a client device 102 may comprise flash memory instead of a hard disk. In one aspect, a client device may include one or more client devices.

In one aspect, a client device 102 is a conventional personal computer (PC). In another aspect, a client device 102 is a specific-purpose client device designed for a specific-purpose (rather than a general purpose). The specific-purpose client device may be, for example, a client device designed as a cashier machine at a department store, a client device designed to carry out specific tests or measurements, a client device designed to carry out a specific medical application for diagnosis and/or treatment of a patient, etc.

In one aspect, a server 108 may represent a computer, a laptop computer, a computing device, a database, an in-house server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server) or a suitable device with a processor. In a preferred aspect, a server 108 is stationary. In another aspect, a server 108 can be mobile. In yet another aspect, a server 108 can be embedded. In certain configurations, a server 108 may be any device that can represent a client device. In a preferred aspect, the server 108 is not a client. In one aspect, a server 108 may include one or more servers, or functions of one or more servers.

In one example, a first device is remote to a second device when the first device is not directly connected to the second device. In one example, a first remote device may be connected to a second device over a communication network such as a Local Area Network (LAN), a Wide Area Network (WAN), and/or other network for remote operations.

When a client device 102 and a server 108 are remote with respect to each other, a client device 102 may connect to a server 108 over a public network 118 and/or the corporate network 114, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other remote network connection. The public network 118 or the corporate network 114 can be a LAN network, a WAN network, a wireless network, the Internet, an intranet or other remote network. In one aspect, the public network 118 or the corporate network 114 may include one or more routers for routing data between client devices and/or servers. A remote device (e.g., client device, server) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. But the subject technology is not limited to these examples.

According to certain aspects of the present disclosure, the terms "server" and "remote server" are generally used synonymously in relation to a client device, and the word "remote" may indicate that a server is in communication with other device(s), for example, over a network connection(s). Similarly, the terms "client device" and "remote client device" are generally used synonymously in relation to a server, and the word "remote" may indicate that a client device is in communication with a server(s), for example, over a network connection(s).

In one aspect of the disclosure, a "client device" may be sometimes referred to as a client or vice versa. Similarly, a "server" may be sometimes referred to as a server device or vice versa.

In some aspects, the server 108 may comprise a RDP server 104 and a virtual desktop accelerator (VDA) server 106. Although the server 108 is shown as comprising both of these servers, one or both servers may be placed outside the server 108. Alternatively, the RDP and VDA servers 104 and 106 may be components or applications (e.g., server applications) running on a same server 108 or on different servers. The server 108 may further comprise various other servers such as a DNS server, a DHCP server, and/or an application server. In some aspects, one or more of these servers may be combined together as a single server. In some aspects, the server 108 may also be referred to as an in-house server because the server 108 may primarily operate to communicate with clients 102a and 102b over a private network such as the corporate network 114. In some aspects, client device 102c is on the same domain.

In some aspects, at least a portion of the server 108 may be accessible from the public network 118. For example, as shown in FIG. 1, the RDP and VDA servers 104 and 106 are accessible from the public network 118. Thus, the client device 102c may communicate with the server 108 (e.g., the RDP server 104 and/or the VDA server 106) via the public network 118.

As shown in FIG. 1, each client device 102 can include a RDP client and/or a VDA client. In one aspect, the RDP client is an application or component running on the client device 102. The RDP client can be configured to connect to the RDP server 104 through the network (114 or 118) to receive an RDP data stream from the RDP server 104, to display received RDP data on the client device 102, and to transmit user input data back to the RDP server 104. Similarly, the VDA client (also referred to as a VDA client component) is an application or component running on the client device 102. The VDA client is configured to connect to the VDA server 106 through the network (114 or 118) to receive a VDA data stream from the VDA server 106, to process the received VDA data so as to generate a corresponding RDP data stream, and to transmit or stream the generated RDP data stream to the RDP client on the client device 102.

According to various aspects of the subject technology, the clients 102 may each be running a windows-based operating system, such as any of the Windows Embedded family of operating systems (e.g., Windows Embedded Compact, Windows Embedded Standard, Windows Embedded Enterprise, Windows Embedded POSReady, Windows Embedded NAVReady, Windows Embedded Server, etc.) or other suitable embedded images. The clients may alternatively be running Linux, UNIX, Android, iOS, or any other appropriate operating system.

Virtual Desktop Accelerator (VDA) System

Figure 2:
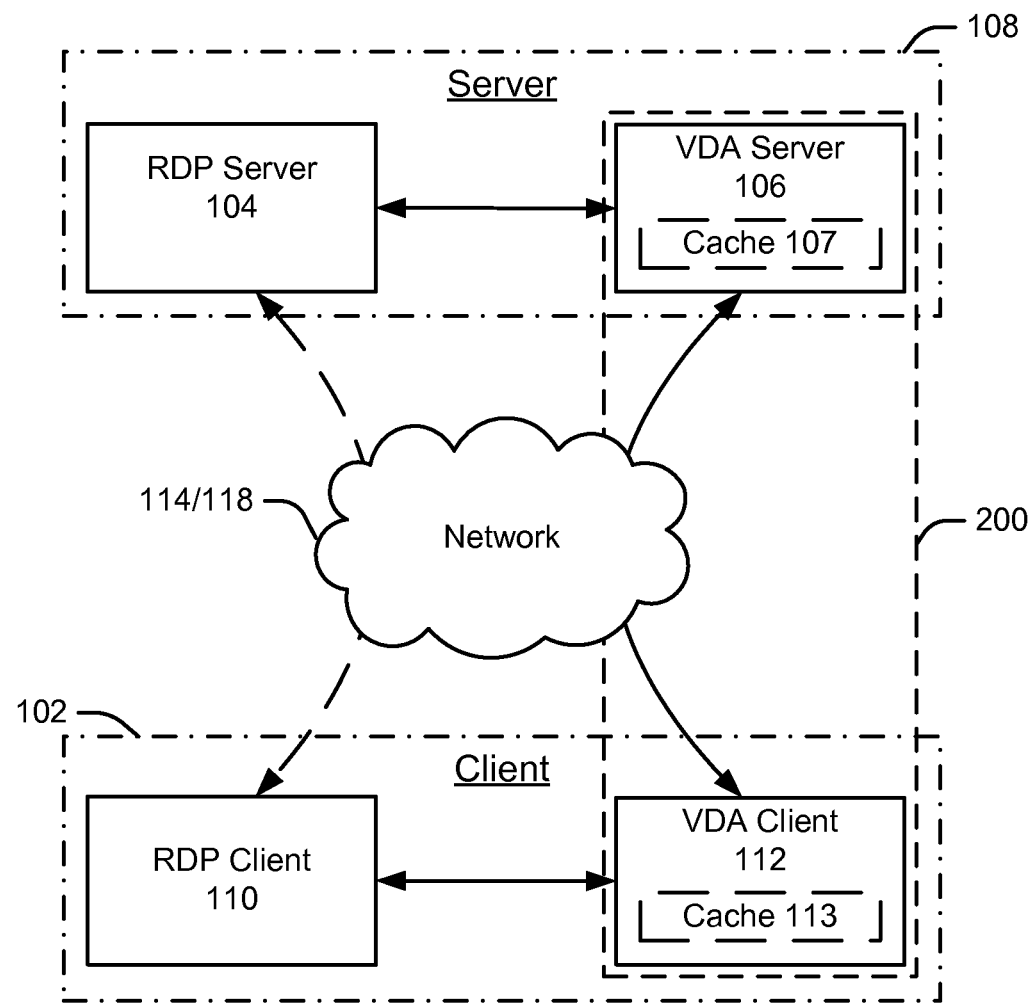
FIG. 2 illustrates a simplified connection diagram of a Virtual Desktop Accelerator (VDA) system, in accordance with various aspects of the subject technology.

FIG. 2 illustrates a simplified connection diagram of a VDA system, in accordance with various aspects of the subject technology. The system may include a server 108, and at least one client device 102 in communication with the server through one or more networks 114/118.

The client device 102 may include a RDP client 110 configured to establish a connection with RDP server 104 so as to receive a RDP stream (or RDP data stream) from the RDP server 104. The client device 102 may further include a VDA client 112 configured to establish a connection with VDA server 106 so as to receive a VDA stream (or VDA data stream) from the VDA server 106. Additionally, the RDP client 110 and VDA client 112 may be configured to communicate with each other on the client device 102.

The server 108 may include a RDP server 104 and a VDA server 106 configured to communicate with each other. The VDA server 106 may further be configured to communicate with the VDA client 112, while the RDP server 104 may be configured to communicate with RDP client 110 either directly (though network(s) 114/118) and indirectly (through VDA server 106, network(s) 114/118, and VDA client 112).

The VDA system 200 includes the VDA server 106 of server 108 and the VDA client 112 of client device 102. In general, the connections (e.g., VDA connection and RDP connection) established with the VDA system and/or the VDA system components are logical connections such as packet switched communication sessions through a packet switched network.

The VDA client 112 and VDA server 106 can be used to increase the efficiency of an RDP connection between the RDP client 110 and the RDP server 104. In particular, the VDA client 112 can be configured to intercept a RDP connection request transmitted by the RDP client 110 to the RDP server 104, and to establish a VDA connection with the VDA server 106, so as to establish a virtual RDP connection between RDP client 110 and RDP server 104 that is routed through (or passes through) the VDA client 112, the established VDA connection, and the VDA server 106. The VDA client 112 and server 106 each include respective memory caches 113 and 107, which may be used by the VDA connection to increase the efficiency of data transmissions and reduce bandwidth usage.

In one aspect of the disclosure, the VDA client 112 is configured to intercept a connection request sent by the RDP client 110 to the RDP server 104 (or RDP server component) of server 108 and, based on the intercepted connection request, to establish a connection to a VDA server 106 (or VDA server component) of server 108. If the VDA client 112 successfully identifies or locates a VDA server 106 on server 108, and successfully establishes a VDA connection to the VDA server 106, the VDA client 112 routes an RDP connection between RDP client 110 and RDP server 104 through the VDA client 112, the established VDA connection, and the VDA server 106. The VDA client may thus function as a proxy RDP server with respect to RDP client 110, by receiving RDP requests from RDP client 110 and transmitting an RDP data stream to RDP client 110. Similarly, the VDA server 106 may function as a proxy RDP client with respect to RDP server 104, by transmitting RDP requests to RDP server 104 and receiving an RDP data stream from RDP server 104. However, if the VDA client 112 is unable to identify or locate a VDA server on server 108, or is unable to establish a VDA connection to VDA server 106, the VDA client 112 can forward to the RDP server 104 the connection request intercepted from the RDP client 110, such that a direct RDP connection between the RDP client 110 and the RDP server 104 can be established.

The connection request intercepted by the VDA client 112 generally includes an internet protocol (IP) address for the RDP server 104 the RDP client 110 is trying to connect to, as well as communication port information for the RDP server 104 and a version number for the RDP protocol to be used. As a part of establishing a VDA connection with the VDA server 106, the VDA client 112 generally sends to the VDA server 106 connection information including one or more of the internet protocol (IP) address for the RDP server 104 retrieved from the intercepted connection request, communication port information for the RDP server 104 retrieved from the intercepted connection request, and information on the maximum number and/or size of cache memory buffers (e.g., memory cache 113) that the VDA client 112 can support for storing screen images or other data. In response to receiving the connection request, the VDA server 106 determines whether a VDA connection should be established with the VDA client 112 based on the connection information. The VDA server 106 may additionally attempt to establish a RDP connection with the RDP server 104 by sending a connection request to the RDP server 104.

If a connection (e.g., a VDA connection) is successfully established between the VDA client 112 and VDA server 106, and if a connection (e.g., a RDP connection) is successfully established between the VDA server 106 and RDP server 104, the VDA system 200 can begin routing data streams. For example, the VDA system 200 can begin routing an RDP stream between the RDP server 104 and RDP client 110 through the VDA connection, and thereby increase the efficiency of data transmissions and reduce bandwidth usage of such transmissions through network(s) 114/118.

When routing a data stream, the VDA system 200 is configured to receive, at the VDA server 106, an RDP data stream from the RDP server 104. The VDA server 106 processes the received RDP data stream to create a VDA data stream for transmission to the VDA client 112. In particular, the VDA server 106 can parse the RDP stream containing RDP content, identify image data or other types of data (referred generally as packet data) included in the RDP stream, and generate an altered RDP stream by adding cache headers to image data (or other types of packet data), compressing the image data (e.g., using JPEG or TIFF image compression) or the packet data (e.g., using ZIP compression), and removing duplicative image or other types of packet data. The VDA server 106 can additionally bulk compress (e.g., by using a compression application such as zlib) and encrypt the altered RDP stream (including image data and/or other types of packet data) to create the VDA stream. The VDA stream is then transmitted to the VDA client 112 through the network(s) 114/118.

In the VDA client 112, the VDA stream can be decrypted and bulk decompressed to reconstruct the altered RDP stream. The decompressed data can then be parsed by the VDA client 112 to identify and retrieve cache headers, compressed image data, and/or other types of packet data. The VDA client 112 can decompress the image or other packet data, and process the cache headers to reconstruct the RDP stream. In one aspect, cache headers include commands for performing operations on memory cache 113, such as storing received image data or other packet data in the memory cache, retrieve stored image or other packet data from the memory cache, and flushing (or clearing) the memory cache. The VDA client 112 thus reconstructs the RDP stream from the VDA stream, and transmits the reconstructed RDP stream to the RDP client 110.

The VDA client 112 can be an application or component running on the client device 102 running the RDP client 110. Alternatively, VDA client 112 can be an application or component running on a router, intermediary server, or other computing device located near RDP client 110 (and remote from RDP server 104), and used to transport the RDP connection request between RDP client 110 and RDP server 104. The VDA client 112 may perform functions including: intercepting a connection request between the RDP client 110 and the RDP server 104; connecting to a VDA server 106 (or VDA server component) on the server 108 or RDP server 104 machine; understanding and parsing of a VDA stream; decrypting data packets received from a VDA server 106; decompressing compressed data received from the VDA server (such as data compressed using a zlib compression algorithm); decompressing RDP screen images received in different formats and modes (e.g., JPEG, TIFF, or the like); and caching (or storing) uncompressed (or decompressed) images or other packet data in a memory cache 113.

In one aspect, the VDA server 106 may be a standalone server, or server application or server component running on the server 108 or the RDP server 104. In another aspect, the VDA server 106 can be a standalone server, or an application or component running on a router, intermediary server, or other computing device located near RDP server 104 (and remote from RDP client 110), and used to transport the RDP connection request between RDP client 110 and RDP server 104. The VDA server 106 is generally active on a machine (e.g., server 104, 106, or 108) remote to the client 102, and the VDA server 106 listens for connections from one or more VDA clients 112. In response to receiving a connection request from and/or establishing a VDA connection with a VDA client 112, the VDA server 106 can try to connect to the RDP server 104 at the IP address and port provided in the connection request received from the VDA client 112. In establishing a connection to the RDP server 104, the VDA server 106 may function as a RDP client (i.e., a proxy RDP client) with respect to the RDP server 104. The VDA server 106 can return a success response (e.g., a connection acknowledgment ACK response message) to the VDA client 112 if the connection to the RDP server 104 is successful; otherwise, the VDA server 106 may send a failure response (e.g., a connection NACK response message) to the VDA client 112.

The VDA server 106 may perform functions including: establishing a connection to the RDP server 104; accepting connections from one or more VDA clients 112; understanding and parsing a RDP data stream; compressing RDP screen images in different formats (e.g., JPEG, TIFF, or the like) or RDP packet data in different formats (e.g., ZIP, or the like); maintaining a memory cache 107 storing hash values; storing a hash function used to generate a unique hash value/key for each image or other packet data in the RDP stream; compressing data using a bulk compression algorithm (e.g., using zlib compression); and encrypting compressed data and forwarding the encrypted data to a VDA client 112.

When the VDA server 106 parses the RDP content received as part of the RDP data stream, the VDA server 106 can compute a hash value or hash key (for example, a 64-bit hash value/key) from each identified image or each identified data packet included in the RDP data stream. The VDA server 106 can then search the memory cache 107 of the VDA server 106 for the computer hash value to determine whether any matching hash value is stored in the memory cache 107. If a matching hash value is found, the VDA server 106 determines that the image or other packet data corresponding to the hash value has previously been transmitted to the VDA client 112, and that the image data or other packet data is stored in the memory cache 113 of the VDA client 112 at a location corresponding to the index value of the location at which the matching hash value is found. The VDA server 106 then generates an altered RDP data stream which includes, for each identified image or data packet, a cache header and, optionally, compressed image data or packet data. If a hash value matching the computed hash value is found in the memory cache 107, the VDA server 106 includes in the altered data stream a cache header including the cache command "CACHE_FETCH" followed by the index value of the location in memory cache 107 at which the hash value was located. If no matching hash value was found in memory cache 107, the VDA server 106 stores the computed hash value at a location corresponding to an index value in memory cache 107, optionally compresses the image data (e.g., using a JPEG or TIFF compression algorithm) or the packet data (e.g., using a ZIP compression algorithm), and includes in the altered data stream a cache header including the command "CACHE_STORE", followed by the index value and the compressed image data or the packet data. Finally, the VDA server 106 bulk compresses the altered RDP stream (e.g., using a zlib compression algorithm) and encrypts the compressed stream to form the VDA data stream, and sends the VDA data stream to the VDA client 112.

VDA System Processing and Signaling

Figure 3:
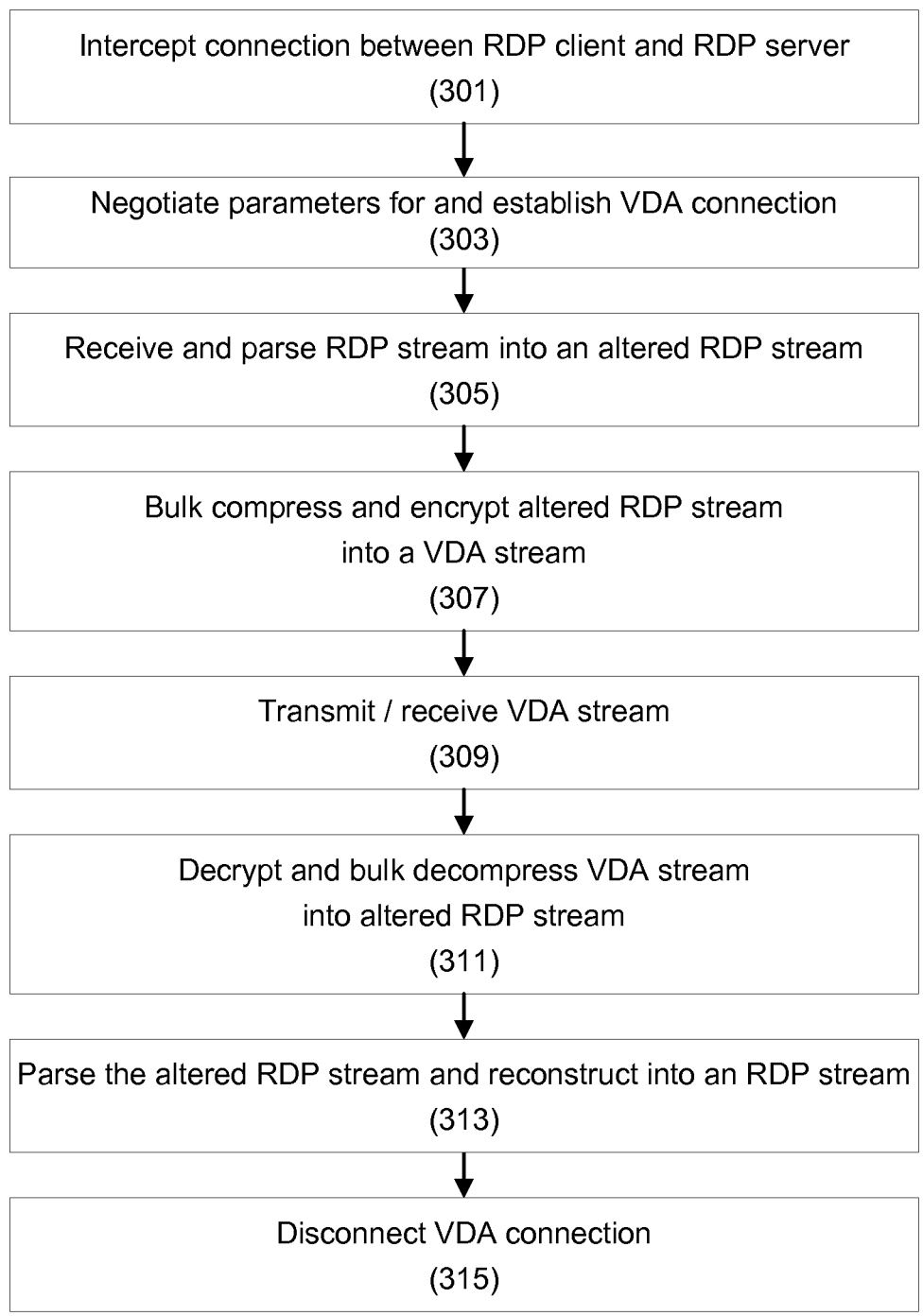
FIG. 3 illustrates a simplified flow diagram of a process performed with a VDA system, in accordance with various aspects of the subject technology.

FIG. 3 illustrates a simplified flow diagram of a process 300 for improving the bandwidth optimization of a communication link using a VDA system, in accordance with various aspects of the subject technology. The process may be used to provide an enriched user experience and an improved bandwidth usage on communication links using the RDP protocol between a client machine 102 and a server machine 108.

The process 300 begins with operation 301, in which a VDA client 112 intercepts a connection between a RDP client 110 and a RDP server 104. In particular, the VDA client 112 may intercept a connection request transmitted by the RDP client 110 for the RDP server 104. The connection request can include a network address for the RDP server 104 (or server 108), such as an IP address and an identification for a communication port of the RDP server 104. The VDA client 112 may intercept the connection request initiated by the RDP client 110 by targeting a standard port (e.g., a RDP port) used by the RDP client 110 for establishing RDP communications. The connection request may be intercepted to prevent a direct RDP connection from being established between the RDP client 110 and RDP server 104. The connection request may further be intercepted to enable VDA client 112 to route communications between the RDP client 110 and RDP server 104 through the VDA client 112 and VDA server 106, so as to proxy the RDP connection and apply data caching (e.g., caching of packet data such as image data or other types of data) and other VDA methods transparently without a user's (or RDP client's 110) knowledge.

In operation 303, the VDA client 112 and VDA server 106 negotiate connection parameters for a VDA connection, and establish the VDA connection through the network(s) 114/118. In particular, VDA client 112 may retrieve from the intercepted connection request the network address for the RDP server 104 (or server 108), and may try to establish a connection with a VDA server 106 associated with the RDP server 104 (or running on or associated with server 108). For example, VDA client 112 can send a connection request for establishing a VDA connection to the server 108 (e.g., to a predefined port of the server 108, such as a dedicated VDA port on which VDA server 106 is listening), to the VDA server 106 associated with the network address of the RDP server 104, or to another appropriate entity.

If no VDA server 106 is present on the VDA port, associated with RDP server 104, and/or running on server 108, the VDA client 112 may not be able to establish a VDA connection with a VDA server. In such situations, the VDA client 112 may receive a connection response message including failure (e.g., a NACK message) or may not receive a connection response message within a determined time period. The VDA client 112 may determine that no VDA connection can be established, and may forward the intercepted connection request message from RDP client 110 to the RDP server 104 to enable a direct RDP connection to be established between the RDP client 110 and the RDP server 104.

If a VDA server 106 is present on the VDA port, associated with RDP server 104, and/or running on server 108, the VDA server 106 may send a connection response message (e.g., a connection acknowledgment ACK) to the VDA client 112. The VDA client 112 and VDA server 106 may proceed to negotiate connection parameters for establishing a VDA connection between each other. The connection parameters may include a memory cache size (e.g., sizes for memory caches 107 and 113) and/or a version (or version number) or other details of the RDP protocol. Once the connection parameters for the VDA connection are negotiated, a VDA connection is established between the VDA client 112 and VDA server 106.

The VDA server 106 will generally accept the connection request from the VDA client 112, and can store the connection parameters (e.g., memory cache size and RDP protocol version details) for the VDA connection to the VDA client 112. In response to establishing the VDA connection with the VDA client 112, the VDA server 106 may receive from the VDA client 112 the RDP connection details included in the intercepted connection request, including the network address of the RDP server 104 and/or communication port information for the RDP server 104. The VDA server 106 can send a connection request to the RDP server 104 at the indicated address or port. The connection request can include the connection details provided by the VDA client, including the RDP protocol version details. If the RDP server 104 validates the connection request (e.g., if the connection parameters included in the request are valid and/or compatible with the RDP server 104), the RDP server 104 can establish an RDP connection to the VDA server 106 and send a connection acknowledgment message to the VDA server 106. The VDA server 106 may then have an active RDP connection to the RDP server 104, and may be able to connect to the RDP server 104. The VDA server 106 may send to the VDA client 112 a connection acknowledgement indicating that a RDP connection to the RDP server 104 has been established and, in turn, the VDA client 112 may send a connection response to the RDP client 110 indicating that a RDP connection has been established.

If the VDA server 106 is unable to establish a RDP connection to the RDP server 104, the VDA server may send a failure response message (e.g., a NACK message) to the VDA client 112. In response to receiving the NACK message, the VDA client 112 may either send a connection NACK message to the RDP client 110, or the VDA client 112 may forward the intercepted connection request message received from RDP client 110 to the RDP server 104 to enable a direct RDP connection to be established between the RDP client 110 and RDP server 104.

Operation 303 may conclude with RDP connections being established between the RDP client 110 and the VDA client 112 and between the VDA server 106 and the RDP server 104, and with a VDA connection being established between the VDA client 112 and VDA server 106. In particular, if the RDP connections and VDA connection are successfully established, the VDA client 112 may function as a proxy RDP server with respect to RDP client 110 and the VDA server 106 may function as a proxy RDP client with respect to RDP server 104. However, if any of the RDP connections or VDA connection cannot be established, a direct RDP connection between the RDP client 110 and RDP server 104 may be established. As such, the VDA client 112 may be interoperable with servers 108 that do not have a VDA server 106 by allowing a RDP connection to be established between the RDP client 110 and RDP server 104 when any of the appropriate VDA and RDP connections cannot be established.

In operation 305, the streaming of data begins from the RDP server 104. The data is streamed as an RDP data stream from the RDP server 104 to the VDA server 106. The RDP data stream may follow the RDP protocol version details communicated as part connection requests in operation 303. The VDA server 106 receives the RDP data stream (or RDP stream) from the RDP server 104, and parses the received RDP stream. In particular, the VDA server 106 may parse each protocol data unit (PDU) received as part of the RDP stream so as to identify image content (or, generally, packet data content) included in the RDP stream. For each identified image (or PDU including image data, or data packet) included in the RDP stream, the VDA server 106 retrieves the image (or packet data) and calculates a hash value (e.g., a 64-bit hash value, or a value which may be referred to as a hash key) for the image (or packet data). The hash value may also be referred to as a hash key, an image hash value, an image hash key, or an image key. For each calculated hash value, the VDA server 106 searches the memory cache 107 for the hash value. The VDA server 106 may then perform one of three exemplary operations based on the results of the search for the hash value in the memory cache 107.

First, if the hash value is not found in the memory cache 107, the VDA server 106 finds an appropriate location in the memory cache 107 to store the hash value. For example, the hash value can be stored in an empty storage location, or the hash value can be stored so as to overwrite data previously stored in a storage location. In one aspect, the hash value is stored in the memory cache using a circular list such that the hash value is stored to overwrite the oldest stored hash value. In another aspect, the hash value is stored using a least-recently-used algorithm such that the hash value is stored to overwrite the stored hash value not having been used in the longest time. In yet another aspect, the hash value is stored using another appropriate cache replacement algorithm. Once the hash value is stored in the memory cache 107, the VDA server 106 identifies an index value indicative of the location at which the hash value is stored in the memory cache 107. The image corresponding to the hash value is then compressed using an appropriate image compression algorithm, for example by using a JPEG or TIFF compression having a selected compression mode such as a visually lossy compression mode, a visually lossless compression mode, or a lossless compression mode. Alternatively, the packet data can optionally be compressed using an appropriate compression algorithm, for example a ZIP compression. The VDA server 106 then creates an altered RDP protocol data unit (PDU) which includes a cache header preceding the compressed image data (or compressed packet data). The cache header includes the cache command "CACHE_STORE" and the index value indicative of the location at which the hash value is stored in the memory cache 107.

Second, if the hash value is found in the memory cache 107, the VDA server 106 retrieves the index value of the memory location at which the hash value is stored. The VDA server 106 then creates an altered RDP PDU including a cache header having the cache command "CACHE_FETCH" followed by the retrieved index value. In general, an altered RDP PDU having the cache header command "CACHE_FETCH" does not include image data (or packet data) or compressed image data (or compressed packet data).

Third, if the VDA server 106 encounters an error with the memory cache 107, determines that the memory cache 107 has been corrupted, determines that the memory cache 107 is out of synchronization with a corresponding memory cache 113 on the associated VDA client 112, and/or receives an error indicating that the memory cache 113 is out of memory, the VDA server 106 can disable data caching by sending an altered RDP PDU including a cache header having the cache command "CACHE_FLUSH". In general, the VDA server 106 compresses the image data using an appropriate image compression algorithm (or, optionally, compresses the packet data), and creates an altered RDP protocol data unit (PDU) which includes the cache header and the compressed image data (or the packet data). The cache header includes the cache command "CACHE_FLUSH" followed by two bytes set to 0.

In operation 305, the VDA server 106 thus receives and parses a received RDP data stream to create an altered RDP stream in which PDUs including image data (or packet data) are replaced with altered PDUs. Portions of the RDP stream (e.g., PDUs) that do not include image data (or packet data) may remain substantially intact and unmodified in the altered RDP stream. Each altered PDU includes one of: a cache command "CACHE_STORE", an index value, and compressed image data (or packet data); a cache command "CACHE_FETCH" and an index value; or a cache command "CACHE_FLUSH" and compressed image data (or packet data).

In operation 307, the VDA server 106 applies bulk compression to the altered RDP stream, such as compression using a compression algorithm or library such as zlib, or another appropriate compression algorithm or library. The VDA server 106 then encrypts the compressed altered RDP stream using an appropriate encryption algorithm, to ensure the security of the encrypted stream. The VDA server 106 may then transmit the encrypted, compressed, and altered RDP stream as a VDA data stream (or VDA stream) to the VDA client 112.

In operation 309, the altered RDP stream is transmitted as a VDA data stream by the VDA server 106 to the VDA client 112 through the network(s) 114/118, and is received by the VDA client 112. Because of the data caching and compression used, the VDA data stream output by the VDA server 106 may occupy substantially less bandwidth than the RDP data stream received by the VDA server 106. The VDA data stream may therefore occupy substantially less bandwidth as it is transmitted through network(s) 114/118 than an equivalent RDP data stream would have occupied.

In operation 311, the VDA client 112 having received the encrypted, compressed, and altered RDP stream (i.e., the VDA data stream) decrypts the received data stream, and bulk decompresses the decrypted stream. The decryption and decompression are performed by using decryption and decompression methods complementary to the encryption and compression methods used in operation 307.

The VDA client 112 then proceeds to parse and reconstruct the altered RDP stream in operation 313. In particular, the VDA client 112 may parse each protocol data unit (PDU) received as part of the altered RDP stream so as to identify PDUs that contain image content (or packet data content). The PDUs containing image content (or packet data content) may correspond to the altered PDUs created in operation 305 and each including a cache header. For each identified PDU containing image content (or packet data content) included in the altered RDP stream, the VDA client 112 may retrieve and process the cache header and any associated image data (or packet data). The VDA client 112 performs one of three exemplary operations based on the retrieved cache header.

First, if the cache header includes the cache command "CACHE_STORE", the VDA client 112 retrieves the index value and the compressed image data (or packet data) included in the PDU. The VDA client 112 decompresses the image data using an appropriate image decompression algorithm, for example by using a JPEG or TIFF decompression having a decompression mode (e.g., visually lossy, visually lossless, or lossless) corresponding to the compression algorithm and mode used in operation 305. The VDA client 112 stores the decompressed image data (or packet data) at a location in memory cache 113 corresponding to the retrieved index value. The VDA client 112 further reconstructs a RDP PDU including the decompressed image data (or packet data).

Second, if the cache header includes the cache command "CACHE_FETCH", the VDA client 112 retrieves the index value including in the PDU. The VDA client 112 then retrieves from the memory cache 113 image data (or packet data) stored in a location corresponding to the retrieved index value, and reconstructs a RDP PDU including the retrieved image data (or packet data).

Third, if the cache header includes the cache command "CACHE_FLUSH", the VDA client 112 flushes (i.e., empties, clears, or deletes contents of) the memory cache 113. The VDA client 112 further resets the memory cache 113. The VDA client 112 retrieves the compressed image data (or packet data) included in the PDU, and decompresses the image data using an appropriate image decompression algorithm. The VDA client 112 further reconstructs a RDP PDU including the decompressed image data (or packet data).

The VDA client 112 may thus reconstruct an RDP stream based on the decompressed altered RDP stream and the reconstructed RDP PDUs. In particular, the VDA client 112 may reconstruct the RDP stream by using the decompressed altered RDP stream, and by replacing each PDU identified as containing image content (or packet data content) with a reconstructed RDP PDU including decompressed image data (or packet data).

The VDA client 112 transmits the reconstructed RDP stream to the RDP client 110. For this purpose, the VDA client 112 may function as a proxy RDP server with respect to the RDP client 110, and may transmit to the RDP client 110 an RDP stream that is substantially identical to the RDP stream transmitted by the RDP server 104 to the VDA server 106.

Operations 305 through 313 may be performed substantially continuously as long as an RDP data stream is received by VDA server 106 for transmission to RDP client 110. The operations 305-313 may alternatively be performed repeatedly or intermittently as RDP data is received from RDP server 104.

In operation 315, the VDA connection between VDA client 112 and VDA server 106 is disconnected. The VDA client 112 or VDA server 106 can be disconnected, for example, in response to receiving a disconnect request from the RDP client 110 or the RDP server 104. In response to receiving a disconnect request, the VDA client 112 and/or VDA server 106 disconnect the VDA connection, clear all cache data from the memory caches 113 and 107, and send disconnection requests to each other.

As described in relation to operation 305, the VDA server 106 creates an altered RDP stream in which each PDU in the RDP stream that includes image data (or, more generally, packet data) is modified or altered. For example, the VDA server 106 may receive a RDP data stream such as the following:

| ... RDP Stream Data ... | RDP PDU including image data (or packet data) | ... RDP Stream Data ... |
|---|---|---|

The VDA server may parse the received RDP data stream to produce an altered RDP data stream in which each RDP PDU that includes image data (or packet data) is replaced by a cache header and, optionally, image data (or packet data), as shown in the following:

| ... RDP Stream Data ... | Cache Header | Image Data or packet data (optional) | ... RDP Stream Data ... |
|---|---|---|---|

The cache header can have a length of 3 bytes, and can have a structure including a cache command (e.g., "CACHE_STORE", "CACHE_FETCH", or "CACHE_FLUSH") and a cache index, as shown in the following:

| Cache Command (1 byte) | Cache Index (2 bytes) |
|---|---|

As a result, the altered RDP data stream may have any of the following structures depending on the cache command included in the cache header:

| ... RDP Stream Data ... | CACHE_STORE | Cache Index | Compressed Image or Packet Data | ... RDP Stream Data ... |
|---|---|---|---|---|
| ... RDP Stream Data ... | CACHE_FETCH | Cache Index | | ... RDP Stream Data ... |
| ... RDP Stream Data ... | CACHE_FLUSH | 00 | Compressed Image or Packet Data | ... RDP Stream Data ... |

The process 300 results in the memory caches 107 and 113 respectively storing hash values and image data (or packet data). In particular, the memory cache 107 can store hash values only, and may generally not store image data (or packet data). Conversely, memory cache 113 can store image data (or packet data) only, and may generally not store hash values. Each storage location in the memory cache 107 may have an associated index value, and each index value may have an associated (or corresponding) storage location in the memory cache 113. When the memory caches 107 and 113 are in synchronization, each storage location in memory cache 107 storing a hash value and having an index value has a corresponding storage location in memory cache 113 having the same index value and storing image data (or packet data) that corresponds to the stored hash value.

Figure 4:
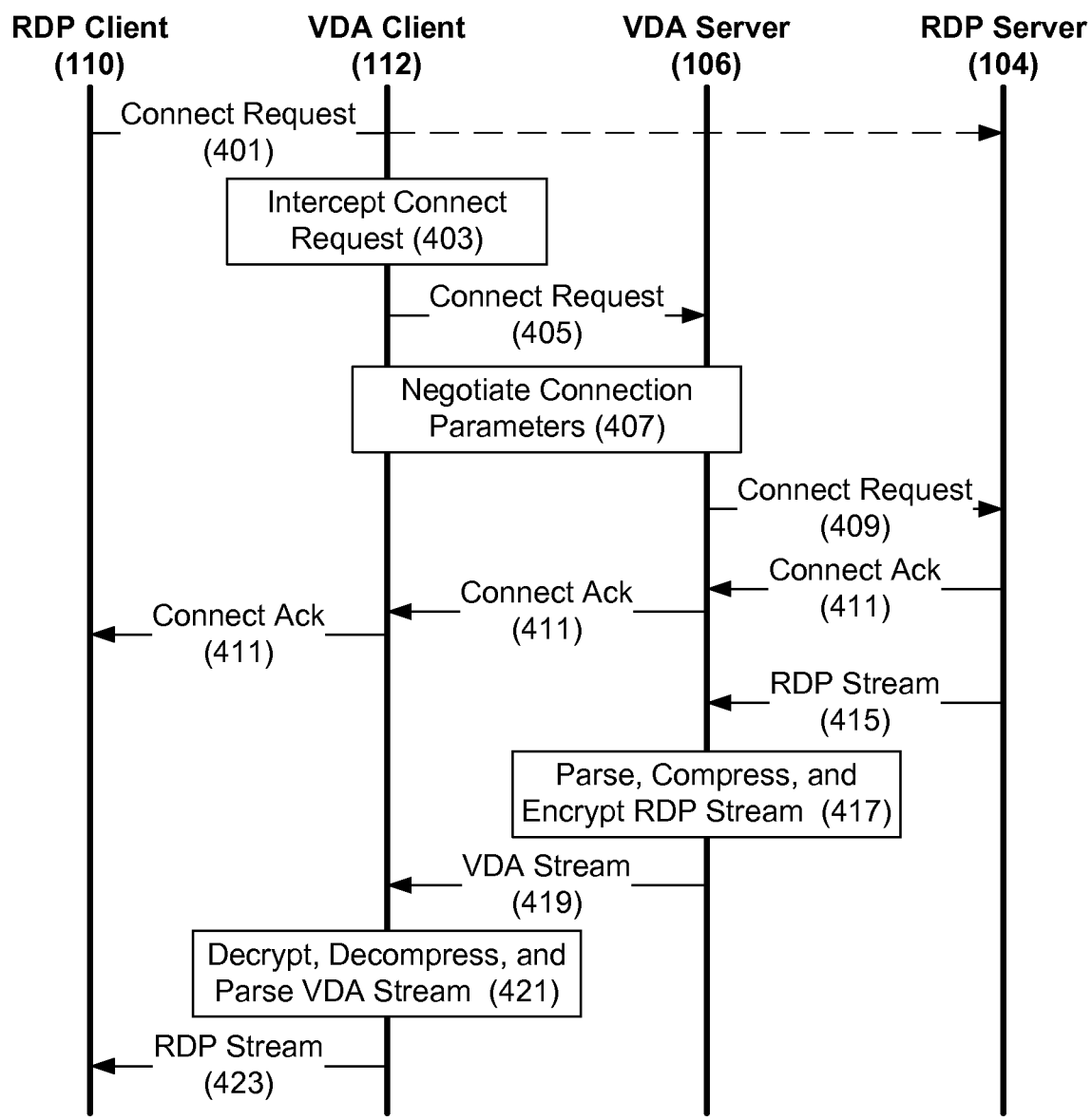
FIG. 4 illustrates a simplified signal timing diagram of a process performed with a VDA system, in accordance with various aspects of the subject technology.

FIG. 4 illustrates a simplified signal timing diagram 400, in accordance with various aspects of the subject technology. The signal timing diagram 400 shows signals exchanged between the RDP client 110, VDA client 112, VDA server 106, and RDP server 104 in establishing a VDA communication connection session between RDP client 110 and RDP server 104 and streaming data therebetween.

The signal timing diagram 400 begins with the RDP client 110 transmitting a connection request for the RDP server 104 in operation 401. The VDA client 112 intercepts the connection request transmitted by RDP client 110 in operation 403 and, in response to intercepting the connection request, transmits a connection request for a VDA server associated with the RDP server 104 identified in the intercepted connection request (operation 405). If a VDA server 106 associated with the RDP server 104 is located, the VDA server 106 and VDA client 112 negotiate connection parameters for and establish a VDA connection in operation 407. Meanwhile, the VDA server 106 may send a connection request to the RDP server 104 identified in the intercepted connection request (operation 409). If the VDA server 106 is successful in establishing a connection with RDP server 104, the RDP server transmits a connection acknowledgement message to the VDA server 106 in operation 411. In response to receiving the connection acknowledgement message, the VDA server 106 sends a connection acknowledgement message to the VDA client 112 which, in turn, can send a connection acknowledgement message to the RDP client 110.

Once RDP connections are established between RDP server 104 and VDA server 106 and between VDA client 112 and RDP client 110, and once a VDA connection is established between VDA server 106 and VDA client 112, the data streaming can begin. In operation 415, the RDP server 104 begins streaming of an RDP data stream to the VDA server 106. The VDA server 106 receives the stream, and parses, compresses and encrypts the received RDP stream into a VDA stream in operation 417. The VDA server 106 then transmits the VDA stream to the VDA client 112 in operation 419. The VDA client 112 decrypts, decompresses, and parses the VDA stream in operation 421 to reconstruct a RDP stream in operation 421, and the RDP stream is transmitted to the RDP client in operation 423.

The VDA client 112 and VDA server 106 (generally referenced as VDA system 200), as described in relation to FIGS. 2, 3, and 4, can thus provide improved bandwidth optimization for RDP.

In particular, the VDA system 200 can minimize the bandwidth usage for transmitting an RDP data stream including image data (or packet data) through a network 114/118 by using improved compression methods, including the use of image compression algorithms having higher compression ratios (e.g., JPEG, TIFF) and/or data compression algorithms (e.g., ZIP); the use of image compression algorithms having different compression modes that may be selected to optimize image compression depending on the desired end-user experience (e.g., use of visually lossy, visually lossless, and lossless compression modes); the use of bulk data compression methods, libraries, and algorithms (e.g., zlib) to further improve the overall compression ratio of the transmitted data; and the like. By using multiple compression methods at the same time, the VDA system 200 can increase the overall compression efficiency of the system. The VDA system 200 can further minimize network bandwidth usage by using image and packet data caching to reduce the transmission of duplicative image data (or packet data) through the network(s) 114/118 between the VDA server 106 and the VDA client 112.

The VDA system 200 can perform the bandwidth optimization while minimizing the computational load on the VDA server 106 and the VDA client 112. For instance, the VDA system 200 reduces the computational load required for encoding and decoding of images (or packet data) by obviating the need to repeatedly encode and decode images (or packet data) that are repeated within a data stream, and by instead encoding each image (or packet data) a single time in the VDA server 106, transmitting the encoded image (or packet data) to the VDA client 112, decoding the image (or packet data) a single time in the VDA client 112, and storing the decoded image (or packet data) in the memory cache 113 such that the image (or packet data) can be used again without requiring any further encoding or decoding. Additionally, by storing hash values in the memory cache 107 of the VDA server 106, and corresponding image data (or packet data) at corresponding index locations in the memory cache 113 of the VDA client 112, the hash value calculation need only be performed on the VDA server 106, thus reducing the amount of computation (or number of CPU cycles) required on the VDA client 112.

The VDA system 200 presents the further advantage of having a centralized control by the VDA server 106 of both memory caches 107 and 113 respectively located on the VDA server 106 and VDA client 112. The centralized control of the memory caches by the VDA server 106 allows the VDA client 112 to perform cache commands received from the VDA server 106, so as to minimize the chances of the memory caches 107 and 113 going out of synchronization. The VDA system 200 further provides encryption of data transferred over the network(s) 114/118 to ensure the security of the RDP stream data being transmitted to the RDP client 110 through the network(s). Finally, the VDA system 200 provides a method for improving the bandwidth optimization of a RDP connection that is transparent to users. The VDA system 100 also provides a method that improves the users' experience seamlessly through the interception and proxying of a normal RDP connection.

VDA Client Processing

Figure 5:
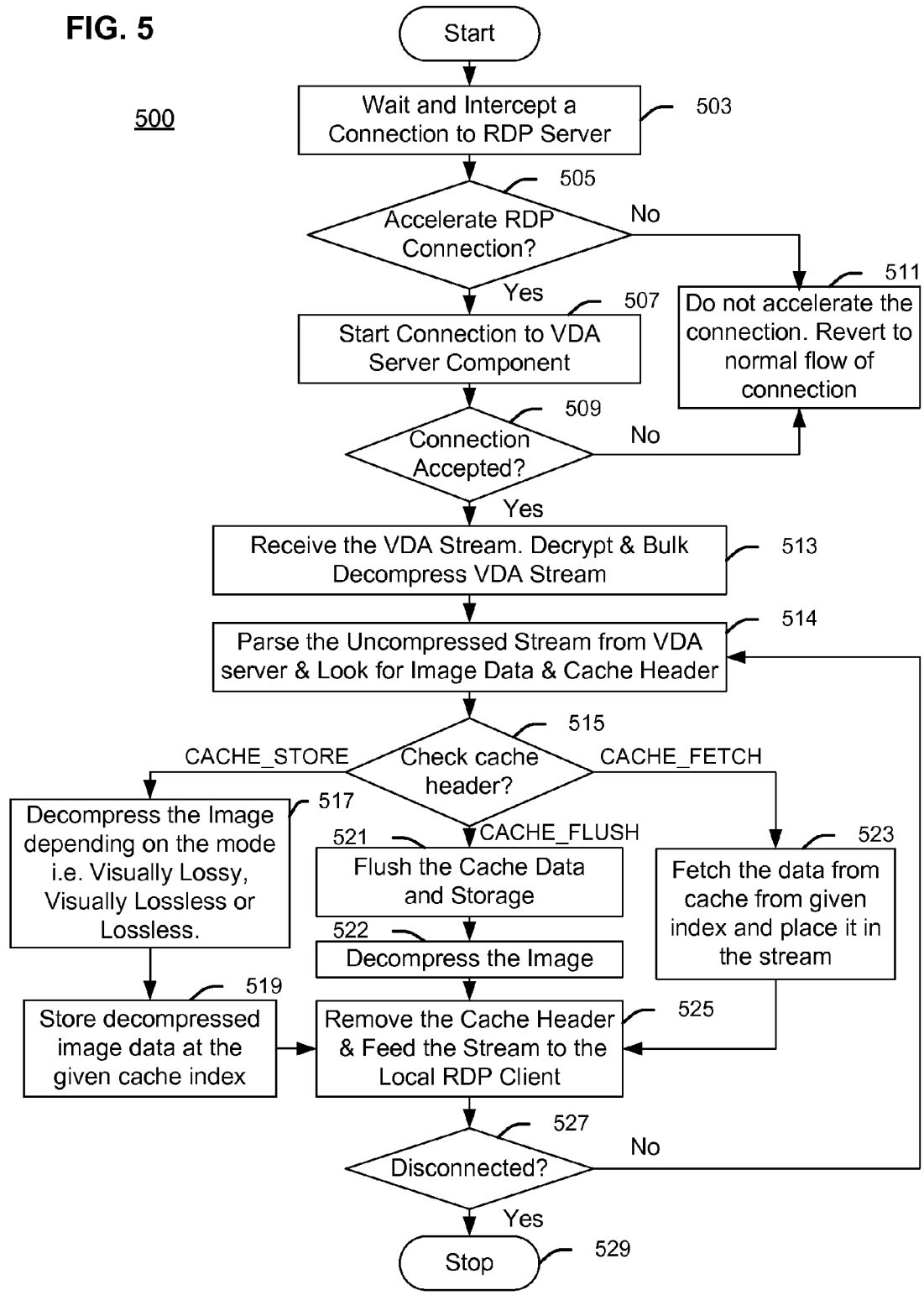
FIG. 5 illustrates a flow diagram of a process performed with a VDA client, in accordance with various aspects of the subject technology.

FIG. 5 illustrates a flow diagram of a process 500 in a VDA client 112 for improving the bandwidth optimization of a communication link using VDA, in accordance with various aspects of the subject technology. The process may be used by a VDA client 112 to initiate a VDA connection and provide VDA services to a RDP client 110.

The process 500 begins with operation 503, in which the VDA client 112 monitors the RDP client 110 of the client device 102 and waits for the RDP client 110 to transmit a connection request for an RDP server 104. When the RDP client 110 transmits a connection request, the VDA client 112 intercepts the connection request. In operation 505, the VDA client 112 determines whether the RDP connection associated with the intercepted connection request should be accelerated. The determination may involve retrieving from the intercepted connection request information including an IP address for the RDP server 104 (or server 108), an identification for a communication port of the RDP server 104 (or server 108), an RDP protocol version number, or the like. The determination may involve determining whether the RDP connection should be accelerated based on the retrieved information. The determination may further involve determining whether a VDA server 106 is associated with the RDP server 104 (or server 108) identified in the connection request. If the VDA client 112 determines that the RDP connection should not be accelerated, the VDA client 112 proceeds in operation 511 not to accelerate the RDP connection and to forward the intercepted connection request directly to the RDP server 104 identified in the connection request such that the RDP server 104 and RDP client 110 can establish a direct RDP connection.

If the VDA client 112 determines that the RDP connection should be accelerated, the VDA client 112 proceeds in operation 507 to initiate a connection to a VDA server 106. The VDA client 112 may send a VDA connection request to the VDA server 106 determined to be associated with RDP server 104 (or server 108) identified in the intercepted connection request. The VDA connection request may include the IP address for the RDP server 104 (or server 108), the RDP server communication port information, or the like. The VDA connection request may further include VDA connection parameters such as a memory cache size (e.g., sizes for memory caches 107 and/or 113) and/or a version (or version number) or other details of the RDP protocol. If the VDA client 112 is unable to establish the VDA connection (operation 509), the VDA client 112 proceeds in operation 511 not to accelerate the RDP connection and to forward the intercepted connection request directly to the RDP server 104 identified in the connection request such that the RDP server 104 and RDP client 110 can establish a direct RDP connection. However, if the VDA client 112 is able to establish a VDA connection with the VDA server 106 (operation 509), the VDA client proceeds to operation 513.

In operation 513, the VDA client 112 waits to receive a VDA stream through the established VDA connection. Once the VDA client 112 begins receiving a VDA stream from the VDA server 106, the VDA client 112 decrypts and bulk decompresses the VDA stream. In operation 514, the VDA client 112 further parses the decrypted and uncompressed stream, and identifies (or looks for) image data (or packet data, such as text data, RDP headers or control packets, or binary data blocks) and cache headers in the parsed stream.

In operation 515, a processing path is chosen based on the identified cache header. Any portion of the parsed stream that does not pertain to image data (or, more generally, packet data from a VDA stream) and does not have an associated cache header remains in a stream that is transmitted to the local RDP client 110 in operation 525. However, for any portion of the parsed stream that has the cache header "CACHE_STORE", the VDA client 112 retrieves the image data (or packet data) accompanying the cache header in operation 517, and decompresses the image data according to an appropriate decompression method (e.g., JPEG, TIFF) and decompression mode (e.g., visually lossy, visually lossless, or lossless). The VDA client 112 further retrieves the index value from the cache header in operation 519, and stores the decompressed image data (or packet data) at a location in the memory cache 113 associated with the retrieved index value. Finally, the VDA client 112 removes the cache header from the stream, and feeds the stream including the decompressed image data (or packet data) to the RDP client 110 in operation 525.

For any portion of the parsed stream that has the cache header "CACHE_FLUSH", the VDA client flushes the memory cache 113 and storage locations in operation 521. The VDA client 112 then retrieves the image data (or packet data) accompanying the cache header in operation 522, and decompresses the image data according to an appropriate decompression mode (e.g., visually lossy, visually lossless, or lossless) or decompresses the packet data. Finally, the VDA client 112 removes the cache header from the stream, and feeds the stream including the decompressed image data (or packet data) to the RDP client 110 in operation 525.

For any portion of the parsed stream that has the cache header "CACHE_FETCH", the VDA client 112 retrieves the index value from the cache header in operation 523, and retrieves from the memory cache 113 the image data (or packet data) stored at the location associated with the retrieved index value. The VDA client then places the retrieved image data (or packet data) into the data stream. Finally, the VDA client 112 removes the cache header from the stream, and feeds the stream including the retrieved image or packet data to the RDP client 110 in operation 525.

Following operation 525, the VDA client determines whether the VDA client 112 is disconnected from the VDA server 106 (operation 527). If the VDA client 112 and VDA server 106 are connected, operation loops back to operation 514 to process a next part of the VDA stream. Alternatively, operation may loop back to operation 513 to receive more data from the VDA stream. If the VDA client 112 and VDA server 106 are disconnected, or if the VDA client 112 has received a disconnection request from either the RDP client 110 or VDA server 106, the VDA client 112 disconnects from the VDA server 106 and RDP client 110 and the procedure 500 ends at operation 529.

VDA Server Processing

Figure 6:
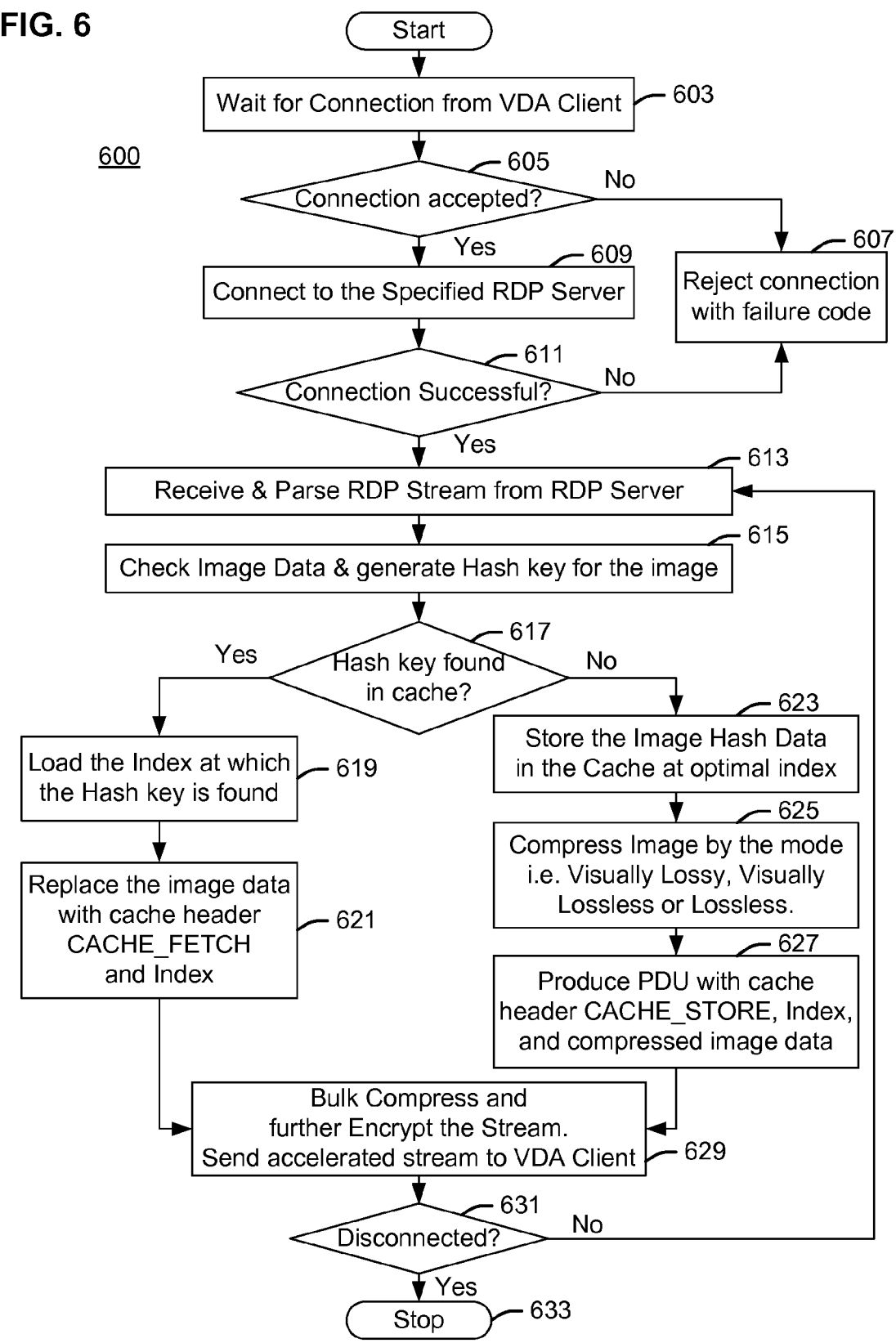
FIG. 6 illustrates a flow diagram of a process performed with a VDA server, in accordance with various aspects of the subject technology.

FIG. 6 illustrates a flow diagram of a process 600 in a VDA server 106 for improving the bandwidth optimization of a communication link using RDP, in accordance with various aspects of the subject technology. The process may be used by a VDA server 106 to process a RDP stream received from a RDP server 104 for transmission as a VDA stream to a VDA client 112.

The process 600 begins with operation 603, in which the VDA server 106 waits for a connection from a VDA client 112. For example, the VDA server 106 may wait to receive a connection request to establish a VDA connection from a VDA client 112. When a connection request is received, the VDA server 106 determines whether the connection should be accepted in operation 605. The VDA connection request may include an IP address for a RDP server 104 (or server 108), a RDP server 104 (or server 108) communication port information, or the like. The VDA connection request may further include VDA connection parameters such as a memory cache size (e.g., size for memory caches 107 and/or 113) and/or a version (or version number) or other details of the RDP protocol. The VDA server 106 may base the determination of whether the connection should be accepted based on the identity of the VDA client 112 from which the connection request was received, based on whether the IP address and port information for the RDP server included in the connection request correspond to an RDP server 104 (or server 108) associated with the VDA server 106, based on whether an RDP protocol version number included in the connection request is supported by the VDA server 106, based on whether the VDA server 106 has sufficient storage space available in the memory cache 107 to accommodate the requested memory cache size, and/or based on other appropriate criteria. If the VDA connection is not accepted, the VDA server 106 rejects the connection by transmitting a failure code to the VDA client 112 in operation 607. The failure code may indicate a reason for which the connection was rejected.

If the VDA connection is accepted, the VDA server 106 proceeds in operation 609 to establish a connection to the RDP server 104 specified in the received connection request. The VDA server 106 may send a connection request message to the RDP server 104 at the IP address and/or port indicated in the connection request, the connection request further indicating the RDP version number received from the VDA client 112. If the RDP server 104 does not accept the connection (operation 611), or if a connection with the RDP server 104 cannot be established for any other reason, the VDA server 106 transmits a failure code to the VDA client 112 in operation 607.

Once the connection to the RDP server 104 is successfully established (operation 611), the VDA server 106 can begin receiving a RDP data stream from the RDP server 104. The VDA server 106 receives a RDP stream from the RDP server 104 in operation 613, and parses the RDP stream to identify and retrieve image data (or packet data) from the stream. Any portions of the RDP stream that do not include image data (or packet data) may remain unaltered in the RDP stream, and may be bulk compressed and encrypted in operation 629. For any portions of the RDP stream that include image data (or packet data), the image data (or packet data) is checked in operation 615, and a hash value (or hash key) is calculated for each image in the image data (or data packet in the packet data).

For each calculated hash value, the VDA server 106 searches the memory cache 107 for the hash value, and determines whether the hash value is stored in or can be found in the memory cache in operation 617. If the hash value is found, the VDA server 106 retrieves (or loads) an index value indicative of the location in the memory cache 107 at which the hash value was found (operation 619). The VDA server 106 then replaces the image data (or packet data) corresponding to the hash value in the RDP stream with the cache header "CACHE_FETCH" followed by the retrieved index value (operation 621), to produce an altered RDP stream. The altered RDP stream is then bulk compressed, the compressed stream is encrypted, and the compressed encrypted stream is sent as an accelerated VDA stream to the VDA client 112 in operation 629.

If the hash value calculated in operation 615 is not found in the memory cache 107, the VDA server 106 determines a location for storing the calculated hash value in the memory cache 107, and stores the hash value at the determined location in operation 623. The VDA server 106 then compresses the image data using an appropriate compression method (e.g., JPEG or TIFF compression) and compression mode (e.g., visually lossy, visually lossless, or lossless) in operation 625. The VDA server 106 may alternatively compress the packet data using an appropriate compression method. The VDA server 106 then replaces the image data (or packet data) corresponding to the hash value in the RDP stream with the cache header "CACHE_STORE", an index value indicative of the storage location storing the hash key calculated in operation 615, and the compressed image data (or packet data), to produce an altered RDP stream (operation 627). The altered RDP stream is then bulk compressed, the compressed stream is encrypted, and the compressed encrypted stream is sent as an accelerated VDA stream to the VDA client 112 in operation 629.

The operations 615-629 may be repeated for each image in the image data (and/or for each packet of packet data) received as part of the RDP stream. Once all of the image data (and/or packet data) has been processed, the VDA server 106 determines whether the VDA server 106 is disconnected from the VDA client 112 or RDP server 104 (operation 631). If the VDA server 106 and VDA client 112 are connected, operation loops back to operation 613 to continue processing the received RDP stream. Alternatively, operation may loop back to operation 615 to process more image data (or packet data) from the received RDP stream. If the VDA server 106 and VDA client 112 are disconnected, if the VDA server 106 and RDP server 104 are disconnected, or if the VDA server 106 has received a disconnection request from either the RDP server 104 or VDA client 112, the VDA server 106 disconnects from the VDA client 112 and RDP server 104 and the procedure 600 ends at operation 633.

Example of Performance Measurements

The VDA systems described herein can be used to provide improved bandwidth optimization for RDP sessions. The following table shows improved bandwidth optimization measurements obtained in two different use cases.

The table presents a first use case in which the content streamed over RDP consists of a Microsoft PowerPoint presentation including 20 slides. Using a normal RDP connection between a RDP client and a RDP server, the streaming in the first use case amounted to a total transfer of 30.9 megabytes of data. Using a VDA connection, however, the streaming in the first use case amounted to a total of 3.0 megabytes using visually lossy compression (corresponding to a 90% reduction in bandwidth usage as compared to the normal RDP connection), 10.3 megabytes using visually lossless compression (corresponding to a 67% reduction in bandwidth usage), and 13.3 megabytes using lossless compression (corresponding to a 57% reduction in bandwidth usage).

The table presents a second use case in which the content streamed over RDP consists of a full screen video of length 2 minutes and 3 seconds from the website youtube.com and shown in a Firefox web browser. Using a normal RDP connection between a RDP client and a RDP server, the streaming in the second use case amounted to a total transfer of 62.5 megabytes of data. Using a VDA connection, however, the streaming in the second use case amounted to a total of 43.0 megabytes using visually lossy compression (corresponding to a 31% reduction in bandwidth usage as compared to the normal RDP connection), 61.7 megabytes using visually lossless compression (corresponding to a 1.3% reduction in bandwidth usage), and 59.9 megabytes using lossless compression (corresponding to a 4.2% reduction in bandwidth usage). While the measurements in the second use case show less pronounced improvements in bandwidth utilization, the user experience in the second use case is improved or enriched as the video transmitted using a VDA connection exhibits little or no skipping of video frames and smoother transition than the video transmitted using the normal RDP connection.

| Content or Data transferred over RDP | Normal RDP data received from RDP Server Data in Bytes | Accelerated RDP Stream using VDA | | | | | |
|---|---|---|---|---|---|---|---|
| | | Visually Lossy | | Visually Lossless | | Lossless | |
| | | Data in Bytes | % of BW Gain | Data in Bytes | % of BW Gain | Data in Bytes | % of BW Gain |
| 20 Slide PPT Slide show | 30,899,020 | 2,950,687 | 90.45 | 10,314,156 | 66.62 | 13,277,533 | 57.03 |
| Full Screen YouTube Video on Firefox of length 2 m 3 s | 62,532,810 | 42,953,008 | 31.31 | 61,717,009 | 1.3 | 59,866,824 | 4.2 |

The measurements presented in the table above were obtained in a network having a network latency of 150 ms, using a client device 102 running a Microsoft Windows XP SP3 operating system and a server 108 running a Microsoft Windows Server 2003 SP2 operating system, and using RDP protocol version 6.1. The measurements in the table do not include the transport such as UDP/TCP, IP and Ethernet headers, since the data compression and optimization performed using the VDA system 200 does not affect the transport overheads. The measurements in the table could rely on various transport protocols for operation, including the TCP or UDP Plus protocols. The Normal RDP condition reported in the table correspond to an RDP transmission with RDP compression on (or enabled), while the accelerated RDP stream using VDA uses zlib bulk compression, image compression using JPEG, and data caching.

Example of Computing Device

Figure 7:
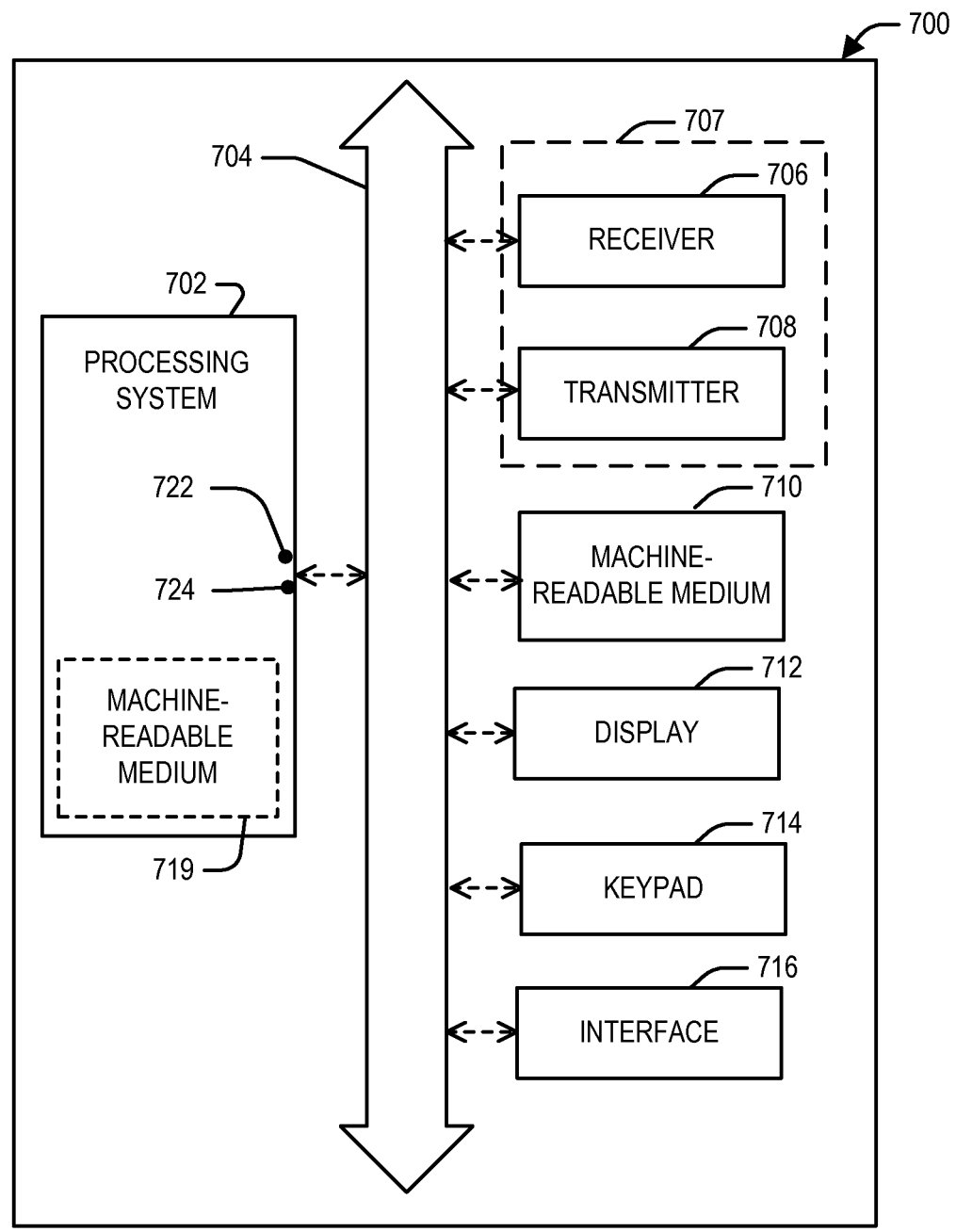
FIG. 7 is a conceptual block diagram illustrating an example of a computing device.

FIG. 7 is a conceptual block diagram illustrating an example of a computing device.

In one aspect, a computing device 700 may be, for example, a client device 102, an RDP client 110, a VDA client 112, a server 108, a RDP server 104, or a VDA server 106, a portion thereof and/or a combination thereof. A computing device may comprise one or more computing devices.

A computing device 700 may include a processing system 702. A processing system may include one or more processors. The processing system 702 is capable of communication with a receiver 706 and a transmitter 708 through a bus 704 or other structures or devices. It should be understood that communication means other than busses can be utilized with the disclosed configurations. The processing system 702 can generate a data stream to be provided to the transmitter 708 for communication. In addition, a data stream can be received at the receiver 706, and processed by the processing system 702. A processor may include one or more processors.

The processing system 702 may include a general-purpose processor or a specific-purpose processor for executing instructions and may further include a machine-readable medium 719 for storing data and/or instructions for software programs. The instructions, which may be stored in a machine-readable medium 710 and/or 719, are executable by the processing system 702 to communicate over various networks and communication connections or sessions, as well as provide other communication and processing functions. The instructions may also include instructions executable by the processing system 702 for various user interface devices, such as a display 712 and a keypad 714. The processing system 702 may include an input port 722 and an output port 724. Each of the input port 722 and the output port 724 may include one or more ports. The input port 722 and the output port 724 may be the same port (e.g., a bi-directional port) or may be different ports.

The processing system 702 may be implemented using software, hardware, or a combination of both. By way of example, the processing system 702 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that can perform calculations or other manipulations of information. Those skilled in the art will recognize how best to implement the described functionality for the processing system 702.

Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code). Instructions may be executable, for example, by a computing device (e.g., a client device or a server) or by a processing system (e.g., a processing system of a client device or a server). Instructions can be, for example, a computer program including code.

A machine-readable medium can be one or more machine-readable media. A machine-readable medium (e.g., 710) may include storage external to a processing system, such as a random access memory (RAM), a flash memory, a read only memory (ROM), a programmable read-only memory (PROM), an erasable PROM (EPROM), registers, a hard disk, a removable disk, a CD-ROM, a DVD, or any other suitable storage device. A machine-readable medium (e.g., 710) may include a memory cache. A machine-readable medium 719 may also have a volatile memory and a non-volatile memory. A machine-readable medium 719 may include storage integrated into a processing system, such as might be the case with an application specific integrated circuit (ASIC). A memory may be a machine-readable medium (e.g., 710 or 719) or a part thereof.

According to one aspect of the disclosure, a machine-readable medium is a computer-readable medium encoded or stored with instructions and is a computing element, which defines structural and functional interrelationships between the instructions and the rest of the computing device, which permit the instructions' functionality to be realized. In one aspect, a machine-readable medium is a non-transitory machine-readable medium, a machine-readable storage medium, or a non-transitory machine-readable storage medium. In one aspect, a machine-readable medium is a computer-readable medium, a non-transitory computer-readable medium, a computer-readable storage medium, or a non-transitory computer-readable storage medium.

An interface 716 may be any type of interface and may reside between any of the components shown in FIG. 7. An interface 716 may also be, for example, an interface to the outside world (e.g., a network interface, or an Internet network interface). A transceiver block 707 may represent one or more transceivers, and each transceiver may include a receiver 706 and a transmitter 708. A functionality implemented in a processing system 702 may be implemented in a portion of a receiver 706, a portion of a transmitter 708, a portion of a machine-readable medium 710, a portion of a display 712, a portion of a keypad 714, or a portion of an interface 716, and vice versa. In one aspect, a computing device may include only some or all of the elements shown in FIG. 7. A computing device may include other elements not shown in FIG. 7. A computing device may include more than one of the same elements.

VDA System Components

FIG. 8A illustrates a simplified block diagram of a client device 102, in accordance with various aspects of the subject technology. A client device 102 may comprise some or all of the following: an intercept module 803, a decryption and decompression module 805, a parse and reconstruct RDP stream module 807, a VDA connection module 809, a receive/transmit module 810, a disconnect module 811, a RDP client module 821, an operating system module 826, and hardware components 828. In some aspects, the intercept module 803, the decryption and decompression module 805, the parse and reconstruct RDP stream module 807, the VDA connection module 809, the receive/transmit module 810, and the disconnect module 811 may be part of a VDA client component 112. In some aspects, the RDP client module 821 may be part of a RDP client component 110. The modules and/or components of the client device 102 may be in communication with one another. In some aspects, the hardware components 828 may comprise various interface and storage devices, and the modules of client device 102 are further in communication with the various interface and storage devices via a system bus. The interface devices may include user interface devices such as one or more output devices (e.g., one or more of a display, a speaker, or other audio, image or video output devices) and one or more input devices (e.g., one or more of a keyboard, a mouse, a trackball, a microphone, a stylus, a touch screen, a touch pad, a pen, a tablet, or other audio, image or video input devices). The modules may also be in communication with the public network 118 or the corporate network 114 via a network connection.

In a preferred embodiment, the modules (e.g., 803 through 811, 821, and 826) are implemented in software (e.g., subroutines and code). In another embodiment, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the present disclosure are further described in the disclosure.

In one example, a specialized VDA client device may comprise the operating system module 826 and some or all of the following: modules 803, 805, 807, 809, 810, and 811. In another example, a specialized RDP client device may comprise the operating system module 826 and the RDP client module 821. In another example, a client device 102 may comprise the operating system module 826 and some or all of the following: modules 803, 805, 807, 809, 810, 811, 821, and 830.

According to some approaches, to provide virtual desktop acceleration services, a client device 102 may need to use VDA system 200. A RDP client module may send a connection request for a RDP server, and an intercept module may intercept the connection request. A VDA connection module may attempt to establish a connection to a VDA server and, once the connection is established, a receive module may receive a VDA data stream. A decryption and decompression module may decrypt and decompress the VDA data stream, and a parse and reconstruct RDP stream module may parse and reconstruct an RDP stream based from the decompress VDA data stream. A transmit module may transmit the reconstructed RDP stream to the RDP client module. Once the streaming is complete, a disconnect module may close the connection to the VDA server.

FIG. 8B illustrates a simplified block diagram of a server 108, in accordance with various aspects of the subject technology. A server 108 may comprise some or all of the following: a VDA connection module 813, a receive/transmit module 814, a disconnect module 815, a parse RDP stream module 817, a compression and encryption module 819, a RDP server module 823, an operating system module 826, and hardware components 828. In some aspects, the VDA connection module 813, the receive/transmit module 814, the disconnect module 815, the parse RDP stream module 817, and the compression and encryption module 819 may be part of a VDA server component 106. In some aspects, the RDP server module 823 may be part of a RDP server component 104. The modules and/or components of the client device 102 may be in communication with one another. In some aspects, the hardware components 828 may comprise various interface and storage devices, and the modules of server 108 are further in communication with the various interface and storage devices via a system bus. The modules may also be in communication with the public network 118 or the corporate network 114 via a network connection.

In a preferred embodiment, the modules (e.g., 813 through 819, 823, and 826) are implemented in software (e.g., subroutines and code). In another embodiment, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the present disclosure are further described in the disclosure.

In one example, a specialized VDA server may comprise the operating system module 826 and some or all of the following: modules 813, 814, 815, 817, and 819. In another example, a specialized RDP server may comprise the operating system module 826 and the RDP server module 823. In another example, a server 108 may comprise the operating system module 826 and some or all of the following: modules 813, 814, 815, 817, 819, 823, and 830.

According to some approaches, to provide virtual desktop acceleration services, a server 108 may need to use a VDA system 200. A VDA connection module may receive a connection request for a VDA client 112, and may establish a connection with the VDA client 112. The VDA connection module may send a connection request to the RDP server module, and establish a connection with the RDP server module. A receive module may receive a RDP data stream from the RDP server module. A parse RDP stream module may parse the RDP stream and generate an altered RDP stream. A compression and encryption module may compress and encrypt the altered RDP stream as a VDA stream, and a transmit module may transmit the VDA stream to the VDA client 112. Once the streaming is complete, a disconnect module may close the connection to the VDA client 112.

Illustration of Subject Technology as Clauses

Illustration of method/apparatus/machine readable storage medium for processing a first data stream received from a remote server to generate a second data stream conforming to a remote desktop protocol (RDP), or for processing a third data stream conforming to the RDP to stream a fourth data stream to a remote client device (described as clauses)

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

1. A method (see, e.g., 900-A in FIG. 9A) for processing a first data stream received from a remote server to generate a second data stream conforming to a remote desktop protocol (RDP), the method comprising:

facilitating processing of the first data stream received from the remote server to retrieve package data units (PDUs) associated with packet data (see, e.g., 902-A in FIG. 9A), wherein each PDU associated with packet data has a header including an index value related to the packet data and indicative of a storage location;

in response to receiving a first PDU including first packet data, the method comprising:

facilitating decompression of the first packet data using a decompression algorithm (see, e.g., 904-A in FIG. 9A); and facilitating storage of the decompressed first packet data in a location of a memory cache corresponding to the index value included in the header of the first PDU (see, e.g., 906-A in FIG. 9A);

in response to receiving a second PDU, facilitating retrieval of second packet data from a location of the memory cache corresponding to the index value included in the header of the second PDU (see, e.g., 908-A in FIG. 9A);

facilitating generation of the second data stream conforming to the RDP and including the decompressed first packet data and the retrieved second packet data (see, e.g., 910-A in FIG. 9A); and facilitating streaming of the generated second data stream conforming to the RDP to a local client (see, e.g., 912-A in FIG. 9A).

2. The method of clause 1, wherein prior to facilitating processing of the first data stream, the method comprises:

facilitating interception of a connection request transmitted from the local client to establish a streaming connection conforming to the RDP with the remote server, the connection request identifying the remote server; and in response to facilitating interception of the connection request, facilitating establishment of a streaming connection with the remote server identified in the connection request to receive the first data stream from the remote server.

3. The method of clause 1, wherein the first data stream does not conform to the RDP.

4. The method of clause 1, wherein prior to facilitating processing of the first data stream, the method comprises:

facilitating decryption of the first data stream received from the remote server; and facilitating bulk decompression of the decrypted first data stream, following the facilitating decryption of the first data stream, wherein the facilitating generation of the second data stream comprises facilitating generation of the second data stream including the decompressed first packet data, the retrieved second packet data, and at least one PDU, from the bulk decompressed decrypted first data stream, that is not associated with packet data.

5. The method of clause 1, wherein the first packet data is first image data, and wherein the facilitating decompression of the first packet data comprises facilitating decompression of the first image data using a JPEG image decompression algorithm having one of a visually lossy, visually lossless, and lossless decompression mode.

Figure 10A:
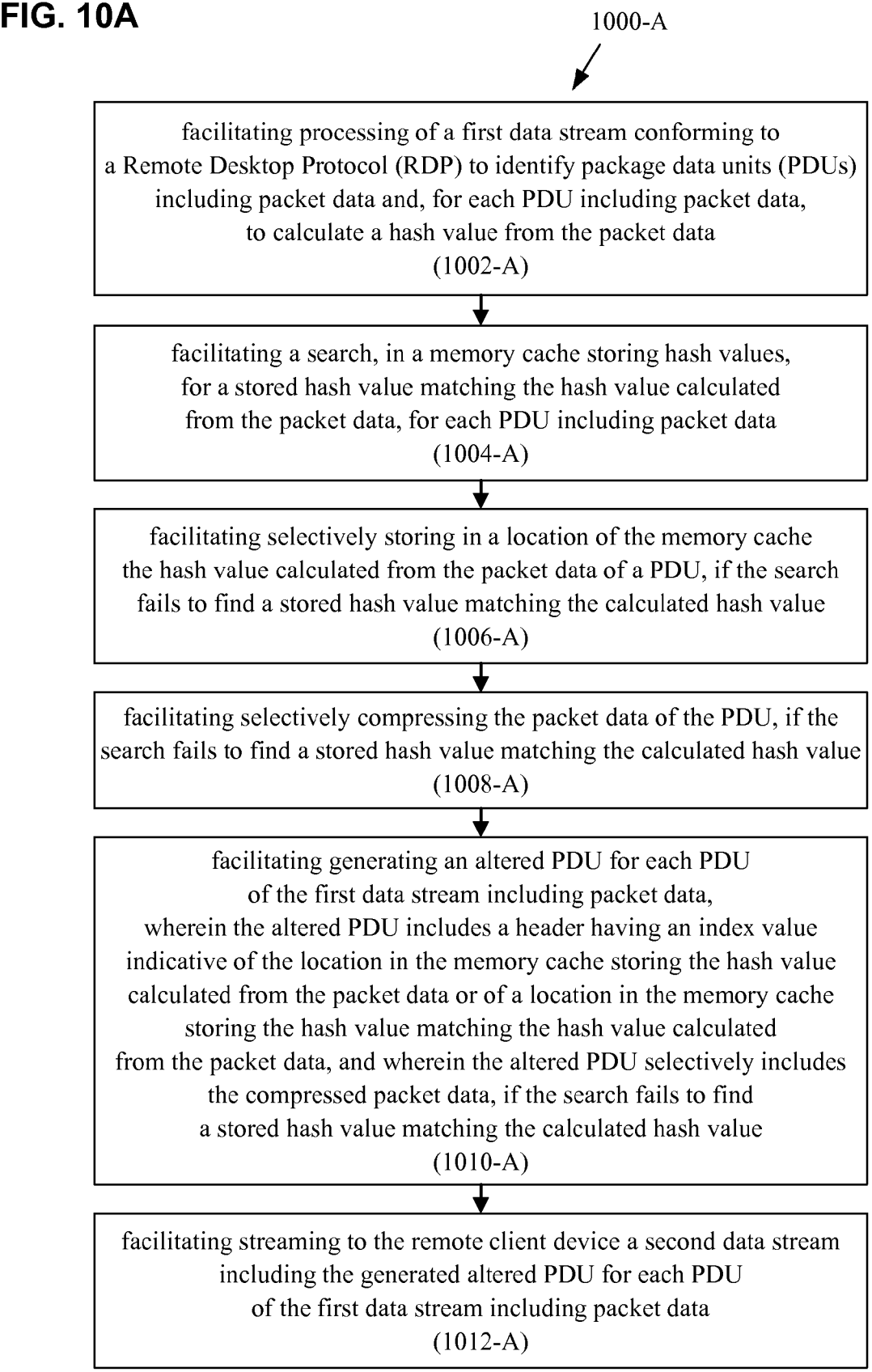

6. A method (see, e.g., 1000-A in FIG. 10A) for processing a first data stream conforming to a remote desktop protocol (RDP) to stream a second data stream to a remote client device, the method comprising:

facilitating processing of the first data stream conforming to the RDP to identify package data units (PDUs) including packet data and, for each PDU including packet data, to calculate a hash value from the packet data (see, e.g., 1002-A in FIG. 10A);

facilitating a search, in a memory cache storing hash values, for a stored hash value matching the hash value calculated from the packet data, for each PDU including packet data (see, e.g., 1004-A in FIG. 10A);

facilitating selectively storing in a location of the memory cache the hash value calculated from the packet data of a PDU, if the search fails to find a stored hash value matching the calculated hash value (see, e.g., 1006-A in FIG. 10A);

facilitating selectively compressing the packet data of the PDU, if the search fails to find a stored hash value matching the calculated hash value (see, e.g., 1008-A in FIG. 10A);

facilitating generating an altered PDU for each PDU of the first data stream including packet data (see, e.g., 1010-A in FIG. 10A), wherein the altered PDU includes a header having an index value indicative of the location in the memory cache storing the hash value calculated from the packet data or of a location in the memory cache storing the hash value matching the hash value calculated from the packet data, and wherein the altered PDU selectively includes the compressed packet data, if the search fails to find a stored hash value matching the calculated hash value; and facilitating streaming to the remote client device the second data stream including the generated altered PDU for each PDU of the first data stream including packet data (see, e.g., 1012-A in FIG. 10A).

7. The method of clause 6, wherein prior to facilitating processing of the first data stream, the method comprises:

facilitating establishing a first streaming connection to the remote client device, in response to receiving a connection request from the remote client device, wherein the connection request identifies the RDP server, and wherein the identified RDP server is a local RDP server; and facilitating establishing a second streaming connection to the RDP server identified in the connection request, in response to receiving the connection request from the remote client.

8. The method of clause 6, wherein the second data stream does not conform to the RDP.

9. The method of clause 6, wherein prior to facilitating streaming of the second data stream, the method comprises:

facilitating generating a data stream including the generated altered PDU for each PDU of the first data stream including packet data, and at least one PDU of the first data stream that does not include packet data;

facilitating bulk compression of the generated data stream; and facilitating encryption of the bulk compressed generated data stream as the second data stream.

10. The method of clause 6, wherein the facilitating selectively compressing the packet data comprises facilitating selectively compressing the packet data using a JPEG image compression algorithm having one of a visually lossy, visually lossless, and lossless compression mode.

11. A machine-readable storage medium (see, e.g., 900-B in FIG. 9B) encoded with instructions executable by one or more processors to perform one or more operations for processing a first data stream received from a remote server to generate a second data stream conforming to a remote desktop protocol (RDP), the one or more operations comprising:

facilitating processing of the first data stream received from the remote server to retrieve package data units (PDUs) associated with packet data (see, e.g., 902-B in FIG. 9B), wherein each PDU associated with packet data has a header including an index value related to the packet data and indicative of a storage location;

in response to receiving a first PDU including first packet data, the one or more operations comprising:

facilitating decompression of the first packet data using a decompression algorithm (see, e.g., 904-B in FIG. 9B); and facilitating storage of the decompressed first packet data in a location of a memory cache corresponding to the index value included in the header of the first PDU (see, e.g., 906-B in FIG. 9B);

in response to receiving a second PDU, facilitating retrieval of second packet data from a location of the memory cache corresponding to the index value included in the header of the second PDU (see, e.g., 908-B in FIG. 9B);

facilitating generation of the second data stream conforming to the RDP and including the decompressed first packet data and the retrieved second packet data (see, e.g., 910-B in FIG. 9B); and facilitating streaming of the generated second data stream conforming to the RDP to a local client (see, e.g., 912-B in FIG. 9B).

12. The machine-readable storage medium of clause 11, wherein prior to facilitating processing of the first data stream, the one or more operations further comprise:

facilitating interception of a connection request transmitted from the local client to establish a streaming connection conforming to the RDP with the remote server, the connection request identifying the remote server; and in response to facilitating interception of the connection request, facilitating establishment of a streaming connection with the remote server identified in the connection request to receive the first data stream from the remote server.

13. The machine-readable storage medium of clause 11, wherein the first data stream does not conform to the RDP.

14. The machine-readable storage medium of clause 11, wherein prior to facilitating processing of the first data stream, the one or more operations further comprise:

facilitating decryption of the first data stream received from the remote server; and facilitating bulk decompression of the decrypted first data stream, following the facilitating decryption of the first data stream, wherein the facilitating generation of the second data stream comprises facilitating generation of the second data stream including the decompressed first packet data, the retrieved second packet data, and at least one PDU, from the bulk decompressed decrypted first data stream, that is not associated with packet data.

15. The machine-readable storage medium of clause 11, wherein the first packet data is first image data, and wherein the facilitating decompression of the first packet data comprises facilitating decompression of the first image data using a JPEG image decompression algorithm having one of a visually lossy, visually lossless, and lossless decompression mode.

Figure 10B:
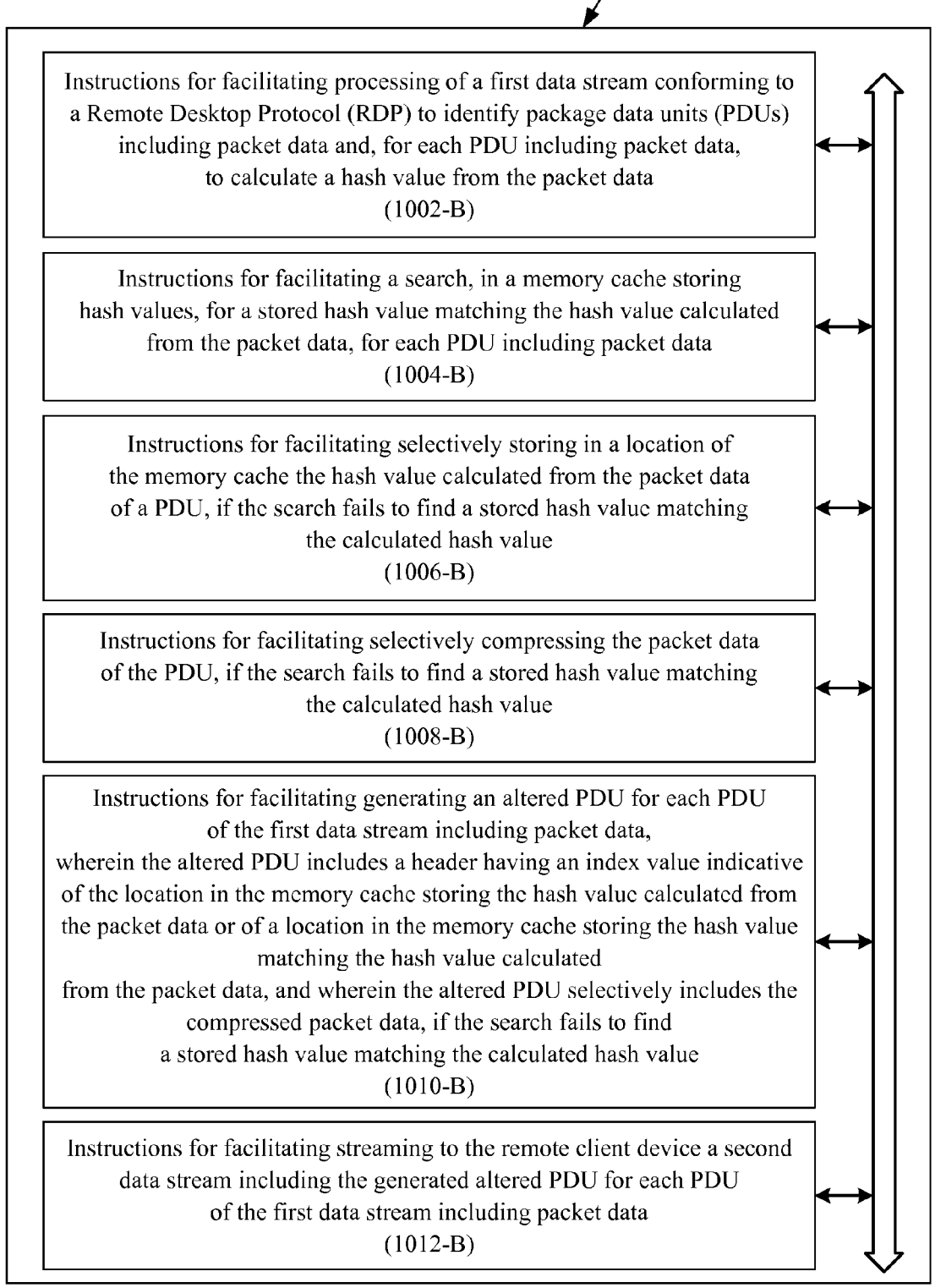

16. A machine-readable storage medium (see, e.g., 1000-B in FIG. 10B) encoded with instructions executable by one or more processors to perform one or more operations for processing a first data stream conforming to a remote desktop protocol (RDP) to stream a second data stream to a remote client device, the one or more operations comprising:

facilitating processing of the first data stream conforming to the RDP to identify package data units (PDUs) including packet data and, for each PDU including packet data, to calculate a hash value from the packet data (see, e.g., 1002-B in FIG. 10B);

facilitating a search, in a memory cache storing hash values, for a stored hash value matching the hash value calculated from the packet data, for each PDU including packet data (see, e.g., 1004-B in FIG. 10B);

facilitating selectively storing in a location of the memory cache the hash value calculated from the packet data of a PDU, if the search fails to find a stored hash value matching the calculated hash value (see, e.g., 1006-B in FIG. 10B);

facilitating selectively compressing the packet data of the PDU, if the search fails to find a stored hash value matching the calculated hash value (see, e.g., 1008-B in FIG. 10B);

facilitating generating an altered PDU for each PDU of the first data stream including packet data (see, e.g., 1010-B in FIG. 10B), wherein the altered PDU includes a header having an index value indicative of the location in the memory cache storing the hash value calculated from the packet data or of a location in the memory cache storing the hash value matching the hash value calculated from the packet data, and wherein the altered PDU selectively includes the compressed packet data, if the search fails to find a stored hash value matching the calculated hash value; and facilitating streaming to the remote client device the second data stream including the generated altered PDU for each PDU of the first data stream including packet data (see, e.g., 1012-B in FIG. 10B).

17. The machine-readable storage medium of clause 16, wherein prior to facilitating processing of the first data stream, the one or more operations further comprise:

facilitating establishing a first streaming connection to the remote client device, in response to receiving a connection request from the remote client device, wherein the connection request identifies the RDP server, and wherein the identified RDP server is a local RDP server; and facilitating establishing a second streaming connection to the RDP server identified in the connection request, in response to receiving the connection request from the remote client.

18. The machine-readable storage medium of clause 16, wherein the second data stream does not conform to the RDP.

19. The machine-readable storage medium of clause 16, wherein prior to facilitating streaming of the second data stream, the one or more operations further comprise:

facilitating generating a data stream including the generated altered PDU for each PDU of the first data stream including packet data, and at least one PDU of the first data stream that does not include packet data;

facilitating bulk compression of the generated data stream; and facilitating encryption of the bulk compressed generated data stream as the second data stream.

20. The machine-readable storage medium of clause 16, wherein the facilitating selectively compressing the packet data comprises facilitating selectively compressing the packet data using a JPEG image compression algorithm having one of a visually lossy, visually lossless, and lossless compression mode.

21. A hardware apparatus (see, e.g., 900-C in FIG. 9C) for processing a first data stream received from a remote server to generate a second data stream conforming to a remote desktop protocol (RDP), the hardware apparatus comprising:

one or more modules configured to perform one or more operations comprising:

facilitating processing of the first data stream received from the remote server to retrieve package data units (PDUs) associated with packet data (see, e.g., 902-C in FIG. 9C), wherein each PDU associated with packet data has a header including an index value related to the packet data and indicative of a storage location;

in response to receiving a first PDU including first packet data, the one or more operations comprising:

facilitating decompression of the first packet data using a decompression algorithm (see, e.g., 904-C in FIG. 9C); and facilitating storage of the decompressed first packet data in a location of a memory cache corresponding to the index value included in the header of the first PDU (see, e.g., 906-C in FIG. 9C);

in response to receiving a second PDU, facilitating retrieval of second packet data from a location of the memory cache corresponding to the index value included in the header of the second PDU (see, e.g., 908-C in FIG. 9C);

facilitating generation of the second data stream conforming to the RDP and including the decompressed first packet data and the retrieved second packet data (see, e.g., 910-C in FIG. 9C); and facilitating streaming of the generated second data stream conforming to the RDP to a local client (see, e.g., 912-C in FIG. 9C).

22. The hardware apparatus of clause 21, wherein the one or more operations comprise, prior to facilitating processing of the first data stream:

facilitating interception of a connection request transmitted from the local client to establish a streaming connection conforming to the RDP with the remote server, the connection request identifying the remote server; and in response to facilitating interception of the connection request, facilitating establishment of a streaming connection with the remote server identified in the connection request to receive the first data stream from the remote server.

23. The hardware apparatus of clause 21, wherein the first data stream does not conform to the RDP.

24. The hardware apparatus of clause 21, wherein prior to facilitating processing of the first data stream, the one or more operations further comprise:

facilitating decryption of the first data stream received from the remote server; and facilitating bulk decompression of the decrypted first data stream, following the facilitating decryption of the first data stream, wherein the facilitating generation of the second data stream comprises facilitating generation of the second data stream including the decompressed first packet data, the retrieved second packet data, and at least one PDU, from the bulk decompressed decrypted first data stream, that is not associated with packet data.

25. The hardware apparatus of clause 21, wherein the first packet data is first image data, and wherein the facilitating decompression of the first packet data comprises facilitating decompression of the first image data using a JPEG image decompression algorithm having one of a visually lossy, visually lossless, and lossless decompression mode.

26. A hardware apparatus (see, e.g., 1000-C in FIG. 10C) for processing a first data stream conforming to a remote desktop protocol (RDP) to stream a second data stream to a remote client device, the hardware apparatus comprising:

one or more modules configured to perform one or more operations comprising:

facilitating processing of the first data stream conforming to the RDP to identify package data units (PDUs) including packet data and, for each PDU including packet data, to calculate a hash value from the packet data (see, e.g., 1002-C in FIG. 10C);

facilitating a search, in a memory cache storing hash values, for a stored hash value matching the hash value calculated from the packet data, for each PDU including packet data (see, e.g., 1004-C in FIG. 10C);

facilitating selectively storing in a location of the memory cache the hash value calculated from the packet data of a PDU, if the search fails to find a stored hash value matching the calculated hash value (see, e.g., 1006-C in FIG. 10C);

facilitating selectively compressing the packet data of the PDU, if the search fails to find a stored hash value matching the calculated hash value (see, e.g., 1008-C in FIG. 10C);

facilitating generating an altered PDU for each PDU of the first data stream including packet data (see, e.g., 1010-C in FIG. 10C), wherein the altered PDU includes a header having an index value indicative of the location in the memory cache storing the hash value calculated from the packet data or of a location in the memory cache storing the hash value matching the hash value calculated from the packet data, and wherein the altered PDU selectively includes the compressed packet data, if the search fails to find a stored hash value matching the calculated hash value; and facilitating streaming to the remote client device the second data stream including the generated altered PDU for each PDU of the first data stream including packet data (see, e.g., 1012-C in FIG. 10C).

27. The hardware apparatus of clause 26, wherein prior to facilitating processing of the first data stream, the one or more operations comprise:

facilitating establishing a first streaming connection to the remote client device, in response to receiving a connection request from the remote client device, wherein the connection request identifies the RDP server, and wherein the identified RDP server is a local RDP server; and facilitating establishing a second streaming connection to the RDP server identified in the connection request, in response to receiving the connection request from the remote client.

28. The hardware apparatus of clause 26, wherein the second data stream does not conform to the RDP.

29. The hardware apparatus of clause 26, wherein prior to facilitating streaming of the second data stream, the one or more operations comprise:

facilitating generating a data stream including the generated altered PDU for each PDU of the first data stream including packet data, and at least one PDU of the first data stream that does not include packet data;

facilitating bulk compression of the generated data stream; and facilitating encryption of the bulk compressed generated data stream as the second data stream.

30. The hardware apparatus of clause 26, wherein the facilitating selectively compressing the packet data comprises facilitating selectively compressing the packet data using a JPEG image compression algorithm having one of a visually lossy, visually lossless, and lossless compression mode.

31. An apparatus (see, e.g., 900-C in FIG. 9C) for processing a first data stream received from a remote server to generate a second data stream conforming to a remote desktop protocol (RDP), the apparatus comprising:

means for facilitating processing of the first data stream received from the remote server to retrieve package data units (PDUs) associated with packet data (see, e.g., 902-C in FIG. 9C), wherein each PDU associated with packet data has a header including an index value related to the packet data and indicative of a storage location;

means for, in response to receiving a first PDU including first packet data, performing operations comprising:

facilitating decompression of the first packet data using a decompression algorithm (see, e.g., 904-C in FIG. 9C); and facilitating storage of the decompressed first packet data in a location of a memory cache corresponding to the index value included in the header of the first PDU (see, e.g., 906-C in FIG. 9C);

means for, in response to receiving a second PDU, facilitating retrieval of second packet data from a location of the memory cache corresponding to the index value included in the header of the second PDU (see, e.g., 908-C in FIG. 9C);

means for facilitating generation of the second data stream conforming to the RDP and including the decompressed first packet data and the retrieved second packet data (see, e.g., 910-C in FIG. 9C); and means for facilitating streaming of the generated second data stream conforming to the RDP to a local client (see, e.g., 912-C in FIG. 9C).

32. The apparatus of clause 31, further comprising:

means for, prior to facilitating processing of the first data stream, facilitating interception of a connection request transmitted from the local client to establish a streaming connection conforming to the RDP with the remote server, the connection request identifying the remote server; and means for, in response to facilitating interception of the connection request, facilitating establishment of a streaming connection with the remote server identified in the connection request to receive the first data stream from the remote server.

33. The apparatus of clause 31, wherein the first data stream does not conform to the RDP.

34. The apparatus of clause 31, further comprising:

means for, prior to facilitating processing of the first data stream, facilitating decryption of the first data stream received from the remote server; and means for facilitating bulk decompression of the decrypted first data stream, following the facilitating decryption of the first data stream, wherein the means for facilitating generation of the second data stream comprise means for facilitating generation of the second data stream including the decompressed first packet data, the retrieved second packet data, and at least one PDU, from the bulk decompressed decrypted first data stream, that is not associated with packet data.

35. The apparatus of clause 31, wherein the first packet data is first image data, and wherein the means for facilitating decompression of the first packet data comprise means for facilitating decompression of the first image data using a JPEG image decompression algorithm having one of a visually lossy, visually lossless, and lossless decompression mode.

36. An apparatus (see, e.g., 1000-C in FIG. 10C) for processing a first data stream conforming to a remote desktop protocol (RDP) to stream a second data stream to a remote client device, the apparatus comprising:

means for facilitating processing of the first data stream conforming to the RDP to identify package data units (PDUs) including packet data and, for each PDU including packet data, to calculate a hash value from the packet data (see, e.g., 1002-C in FIG. 10C);

means for facilitating a search, in a memory cache storing hash values, for a stored hash value matching the hash value calculated from the packet data, for each PDU including packet data (see, e.g., 1004-C in FIG. 10C);

means for facilitating selectively storing in a location of the memory cache the hash value calculated from the packet data of a PDU, if the search fails to find a stored hash value matching the calculated hash value (see, e.g., 1006-C in FIG. 10C);

means for facilitating selectively compressing the packet data of the PDU, if the search fails to find a stored hash value matching the calculated hash value (see, e.g., 1008-C in FIG. 10C);

means for facilitating generating an altered PDU for each PDU of the first data stream including packet data (see, e.g., 1010-C in FIG. 10C), wherein the altered PDU includes a header having an index value indicative of the location in the memory cache storing the hash value calculated from the packet data or of a location in the memory cache storing the hash value matching the hash value calculated from the packet data, and wherein the altered PDU selectively includes the compressed packet data, if the search fails to find a stored hash value matching the calculated hash value; and means for facilitating streaming to the remote client device the second data stream including the generated altered PDU for each PDU of the first data stream including packet data (see, e.g., 1012-C in FIG. 10C).

37. The apparatus of clause 36, further comprising:

means for, prior to facilitating processing of the first data stream, facilitating establishing a first streaming connection to the remote client device, in response to receiving a connection request from the remote client device, wherein the connection request identifies the RDP server, and wherein the identified RDP server is a local RDP server; and means for facilitating establishing a second streaming connection to the RDP server identified in the connection request, in response to receiving the connection request from the remote client.

38. The apparatus of clause 36, wherein the second data stream does not conform to the RDP.

39. The apparatus of clause 36, further comprising:

means for, prior to facilitating streaming of the second data stream, facilitating generating a data stream including the generated altered PDU for each PDU of the first data stream including packet data, and at least one PDU of the first data stream that does not include packet data;

means for facilitating bulk compression of the generated data stream; and means for facilitating encryption of the bulk compressed generated data stream as the second data stream.

40. The apparatus of clause 36, wherein the means for facilitating selectively compressing the packet data comprise means for facilitating selectively compressing the packet data using a JPEG image compression algorithm having one of a visually lossy, visually lossless, and lossless compression mode.

Other Remarks

In one aspect, any of the clauses herein may depend from any one of the independent clauses or any one of the dependent clauses. In one aspect, any of the clauses (e.g., dependent or independent clauses) may be combined with any other clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein (e.g., client device 102, server 108, RDP client 110, VDA client 112, RDP server 104, VDA server 106, and the components therein) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) for performing the function(s) or operation(s), where the instruction(s) are encoded or stored on a machine-readable medium, on another device, or on a portion thereof, where an instruction(s) may be software, an application(s), a subroutine(s), or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.). Those skilled in the art will recognize how to implement the instructions, circuits, and processing systems.

A reference to an element in the singular is not intended to mean "one and only one" unless specifically so stated, but rather "one or more." For example, a client device may refer to one or more client devices, a connection may refer to one or more connections, and a message, request, acknowledgment, or stream may refer to one or more messages, requests, acknowledgements, or streams.

Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect of the disclosure, when actions or functions are described as being performed by an item (e.g., waiting, receiving, intercepting, connecting, negotiating, establishing, parsing, compressing, encrypting, transmitting, decrypting, decompressing, reconstructing, generating, disconnecting, searching, matching, storing, retrieving, streaming, or any other action or function), it is understood that such actions or functions may be performed by the item directly or indirectly. In one aspect, when a module is described as performing an action, the module may be understood to perform the action directly. In one aspect, when a module is described as performing an action, the module may be understood to perform the action indirectly, for example, by facilitating, enabling or causing such an action.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "connect", "connection", or the like may refer to a logical connection session between components, modules, or devices over a packet switched network. In another aspect, the term "connect", "connection", or the like may refer to a physical or electrical connection.

Various items may be arranged differently (e.g., arranged in a different order, or partitioned in a different way) all without departing from the scope of the subject technology. In one example, a VDA server 106 may not form part of server 108, but may instead be associated with the server 108. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A method for processing a first data stream conforming to a remote desktop protocol (RDP) to stream a second data stream to a remote client device, the method comprising:
    facilitating establishing a first streaming connection to the remote client device, in response to receiving a connection request from the remote client device,
        wherein the connection request identifies an RDP server, and
        wherein the identified RDP server is a local RDP server;
    facilitating establishing a second streaming connection to the RDP server identified in the connection request, in response to receiving the connection request from the remote client;
    facilitating processing of the first data stream conforming to the RDP to identify package data units (PDUs) including packet data and, for each PDU including packet data, to calculate a hash value from the packet data;
    facilitating a search, in a memory cache storing hash values, for a stored hash value matching the hash value calculated from the packet data, for each PDU including packet data;
    facilitating selectively storing in a location of the memory cache the hash value calculated from the packet data of a PDU, if the search fails to find a stored hash value matching the calculated hash value;
    facilitating selectively compressing the packet data of the PDU, if the search fails to find a stored hash value matching the calculated hash value;
    facilitating generating an altered PDU for each PDU of the first data stream including packet data,
        wherein the altered PDU includes a header having an index value indicative of the location in the memory cache storing the hash value calculated from the packet data or of a location in the memory cache storing the hash value matching the hash value calculated from the packet data, and
        wherein the altered PDU selectively includes the compressed packet data, if the search fails to find a stored hash value matching the calculated hash value; and
    facilitating streaming to the remote client device the second data stream including the generated altered PDU for each PDU of the first data stream including packet data.

2. The method of claim 1, wherein the second data stream does not conform to the RDP.

3. The method of claim 1, wherein prior to facilitating streaming of the second data stream, the method comprises:
    facilitating generating a data stream including the generated altered PDU for each PDU of the first data stream including packet data, and at least one PDU of the first data stream that does not include packet data;
    facilitating bulk compression of the generated data stream; and
    facilitating encryption of the bulk compressed generated data stream as the second data stream.

4. The method of claim 1, wherein the facilitating selectively compressing the packet data comprises facilitating selectively compressing the packet data using a JPEG image compression algorithm having one of a visually lossy, visually lossless, and lossless compression mode.

5. A non-transitory machine-readable storage medium encoded with instructions executable by one or more processors for processing a first data stream conforming to a remote desktop protocol (RDP) to stream a second data stream to a remote client device, the instructions, when executed, for causing the one or more processors to perform:

facilitating establishing a first streaming connection to the remote client device, in response to receiving a connection request from the remote client device,
   wherein the connection request identifies the RDP server, and
   wherein the identified RDP server is a local RDP server;
facilitating establishing a second streaming connection to the RDP server identified in the connection request, in response to receiving the connection request from the remote client;
facilitating processing of the first data stream conforming to the RDP to identify package data units (PDUs) including packet data and, for each PDU including packet data, to calculate a hash value from the packet data;
facilitating a search, in a memory cache storing hash values, for a stored hash value matching the hash value calculated from the packet data, for each PDU including packet data;
facilitating selectively storing in a location of the memory cache the hash value calculated from the packet data of a PDU, if the search fails to find a stored hash value matching the calculated hash value;
facilitating selectively compressing the packet data of the PDU, if the search fails to find a stored hash value matching the calculated hash value;
facilitating generating an altered PDU for each PDU of the first data stream including packet data,
   wherein the altered PDU includes a header having an index value indicative of the location in the memory cache storing the hash value calculated from the packet data or of a location in the memory cache storing the hash value matching the hash value calculated from the packet data, and
   wherein the altered PDU selectively includes the compressed packet data, if the search fails to find a stored hash value matching the calculated hash value; and
facilitating streaming to the remote client device the second data stream including the generated altered PDU for each PDU of the first data stream including packet data.

6. The machine-readable storage medium of claim 5, wherein the second data stream does not conform to the RDP.

7. The machine-readable storage medium of claim 5, wherein prior to facilitating streaming of the second data stream, the instructions further cause the one or more processors to perform:
   facilitating generating a data stream including the generated altered PDU for each PDU of the first data stream including packet data, and at least one PDU of the first data stream that does not include packet data;
   facilitating bulk compression of the generated data stream; and
   facilitating encryption of the bulk compressed generated data stream as the second data stream.

8. The machine-readable storage medium of claim 5, wherein the facilitating selectively compressing the packet data comprises facilitating selectively compressing the packet data using a JPEG image compression algorithm having one of a visually lossy, visually lossless, and lossless compression mode.

9. A hardware apparatus for processing a first data stream conforming to a remote desktop protocol (RDP) to stream a second data stream to a remote client device, the hardware apparatus comprising:
   a processing system configured to access a memory media, wherein the memory media stores instructions executable by the processing system, the instructions for:
      facilitating establishing a first streaming connection to the remote client device, in response to receiving a connection request from the remote client device,
         wherein the connection request identifies the RDP server, and
         wherein the identified RDP server is a local RDP server;
      facilitating establishing a second streaming connection to the RDP server identified in the connection request, in response to receiving the connection request from the remote client:
      facilitating processing of the first data stream conforming to the RDP to identify package data units (PDUs) including packet data and, for each PDU including packet data, to calculate a hash value from the packet data;
      facilitating a search, in a memory cache storing hash values, for a stored hash value matching the hash value calculated from the packet data, for each PDU including packet data;
      facilitating selectively storing in a location of the memory cache the hash value calculated from the packet data of a PDU, if the search fails to find a stored hash value matching the calculated hash value;
      facilitating selectively compressing the packet data of the PDU, if the search fails to find a stored hash value matching the calculated hash value;
      facilitating generating an altered PDU for each PDU of the first data stream including packet data,
         wherein the altered PDU includes a header having an index value indicative of the location in the memory cache storing the hash value calculated from the packet data or of a location in the memory cache storing the hash value matching the hash value calculated from the packet data, and
         wherein the altered PDU selectively includes the compressed packet data, if the search fails to find a stored hash value matching the calculated hash value; and
      facilitating streaming to the remote client device the second data stream including the generated altered PDU for each PDU of the first data stream including packet data.

10. The hardware apparatus of claim 9, wherein the second data stream does not conform to the RDP.

11. The hardware apparatus of claim 9, wherein prior to facilitating streaming of the second data stream, the instructions are for:
   facilitating generating a data stream including the generated altered PDU for each PDU of the first data stream including packet data, and at least one PDU of the first data stream that does not include packet data;
   facilitating bulk compression of the generated data stream; and
   facilitating encryption of the bulk compressed generated data stream as the second data stream.

12. The hardware apparatus of claim 9, wherein the facilitating selectively compressing the packet data comprises facilitating selectively compressing the packet data using a JPEG image compression algorithm having one of a visually lossy, visually lossless, and lossless compression mode.

13. An apparatus for processing a first data stream conforming to a remote desktop protocol (RDP) to stream a second data stream to a remote client device, the apparatus comprising:
   first means for, prior to facilitating processing of the first data stream, facilitating establishing a first streaming connection to the remote client device, in response to receiving a connection request from the remote client device, wherein the connection request identifies the RDP server, and
wherein the identified RDP server is a local RDP server;
second means for facilitating establishing a second streaming connection to the RDP server identified in the connection request, in response to receiving the connection request from the remote client;
third means for facilitating processing of the first data stream conforming to the RDP to identify package data units (PDUs) including packet data and, for each PDU including packet data, to calculate a hash value from the packet data;
fourth means for facilitating a search, in a memory cache storing hash values, for a stored hash value matching the hash value calculated from the packet data, for each PDU including packet data;
fifth means for facilitating selectively storing in a location of the memory cache the hash value calculated from the packet data of a PDU, if the search fails to find a stored hash value matching the calculated hash value;
sixth means for facilitating selectively compressing the packet data of the PDU, if the search fails to find a stored hash value matching the calculated hash value;
seventh means for facilitating generating an altered PDU for each PDU of the first data stream including packet data,
wherein the altered PDU includes a header having an index value indicative of the location in the memory cache storing the hash value calculated from the packet data or of a location in the memory cache storing the hash value matching the hash value calculated from the packet data, and
wherein the altered PDU selectively includes the compressed packet data, if the search fails to find a stored hash value matching the calculated hash value; and
eighth means for facilitating streaming to the remote client device the second data stream including the generated altered PDU for each PDU of the first data stream including packet data.

14. The apparatus of claim 13, wherein the second data stream does not conform to the RDP.

15. The apparatus of claim 13, further comprising:
ninth means for, prior to facilitating streaming of the second data stream, facilitating generating a data stream including the generated altered PDU for each PDU of the first data stream including packet data, and at least one PDU of the first data stream that does not include packet data;
tenth means for facilitating bulk compression of the generated data stream; and
eleventh means for facilitating encryption of the bulk compressed generated data stream as the second data stream.

16. The apparatus of claim 13, wherein the sixth means for facilitating selectively compressing the packet data comprise twelvth means for facilitating selectively compressing the packet data using a JPEG image compression algorithm having one of a visually lossy, visually lossless, and lossless compression mode.

* * * * *